(12) United States Patent
Hirayama et al.

(10) Patent No.: US 10,136,203 B2
(45) Date of Patent: Nov. 20, 2018

(54) DISPLAY DEVICE

(71) Applicant: Saturn Licensing LLC, New York, NY (US)

(72) Inventors: Masatoshi Hirayama, Kanagawa (JP); Haruto Kusunoki, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 8 days.

(21) Appl. No.: 14/654,261

(22) PCT Filed: Dec. 19, 2013

(86) PCT No.: PCT/JP2013/084068
§ 371 (c)(1),
(2) Date: Jun. 19, 2015

(87) PCT Pub. No.: WO2014/103871
PCT Pub. Date: Jul. 3, 2014

(65) Prior Publication Data
US 2015/0358706 A1    Dec. 10, 2015

(30) Foreign Application Priority Data

Dec. 28, 2012 (JP) ................................ 2012-289074

(51) Int. Cl.
*H04R 1/02* (2006.01)
*H04N 5/64* (2006.01)
*H04R 5/02* (2006.01)

(52) U.S. Cl.
CPC ............. *H04R 1/025* (2013.01); *H04N 5/642* (2013.01); *H04R 1/028* (2013.01); *H04R 5/02* (2013.01); *H04R 2499/15* (2013.01)

(58) Field of Classification Search
CPC .................................................... H04B 1/086
(Continued)

(56) References Cited

U.S. PATENT DOCUMENTS 6,999,595 B2    2/2006  Anderson et al.
7,259,964 B2    8/2007  Yamamura et al.
(Continued)

FOREIGN PATENT DOCUMENTS

CN    1163537 A    10/1997
CN    2481062 Y    3/2002
(Continued)

OTHER PUBLICATIONS

International Search Report from International Publication No. PCT/JP2013/084068 mailed Feb. 4, 2014.

*Primary Examiner* — Md S Elahee
(74) *Attorney, Agent, or Firm* — Lerner, David, Littenberg, Krumholz & Mentlik, LLP

(57) ABSTRACT

To enhance positional accuracy of a speaker unit and to prevent sound leakage of sound outputted from the speaker unit and air leakage. Included are: a display configured to allow an image to be displayed on a display screen; a front board mounted on a front side of the display; a mount frame that is mounted on a rear surface side of the front board and includes a speaker mount section; a speaker bracket that is mounted on the speaker mount section and includes a sound output hole; and a speaker unit that is attached to the speaker bracket and includes a sound output section. The speaker mount section is provided with an insertion hole. The front board is provided with a mount hole superposed on the insertion hole. The speaker bracket is provided with a mount protrusion that is inserted in the insertion hole and the mount hole and is positioned with respect to the mount hole. The speaker bracket is provided with a sealing cushion located around the sound output section.

7 Claims, 30 Drawing Sheets

(58) Field of Classification Search
USPC ............... 381/333, 388; 345/55; 349/12, 60; 348/794
See application file for complete search history.

(56) References Cited

U.S. PATENT DOCUMENTS

| | | | |
|---|---|---|---|
| 7,410,029 | B2 | 8/2008 | Tanaami |
| 7,953,242 | B2 | 5/2011 | Soga |
| 8,103,033 | B2 | 1/2012 | Drake et al. |
| 8,116,505 | B2 | 2/2012 | Kawasaki-Hedges et al. |
| 8,594,360 | B2 | 11/2013 | Nishiyama et al. |
| 2006/0201739 | A1 | 9/2006 | Tanaami |
| 2006/0238446 | A1* | 10/2006 | Takahashi ............. G06F 1/1601 345/55 |
| 2006/0280327 | A1 | 12/2006 | Nakagawa |
| 2006/0280329 | A1 | 12/2006 | Soga |
| 2008/0094786 | A1 | 4/2008 | Liou et al. |
| 2009/0168321 | A1 | 7/2009 | Kataoka et al. |
| 2010/0034417 | A1 | 2/2010 | Wada et al. |
| 2014/0097603 | A1* | 4/2014 | Chung ................. B60R 19/205 280/770 |

FOREIGN PATENT DOCUMENTS

| | | | |
|---|---|---|---|
| CN | 1929576 A | 3/2007 | |
| CN | 2884742 Y | 3/2007 | |
| EP | 1526722 A1 | 4/2005 | |
| EP | 1703766 A2 | 9/2006 | |
| EP | 1796384 A2 | 6/2007 | |
| GB | 1124412 A * | 11/1966 | ............. H04B 1/086 |
| JP | 2002-165286 A | 6/2002 | |
| JP | 2002-252892 A | 9/2002 | |
| JP | 2004363832 A | 12/2004 | |
| JP | 2005-080173 A | 3/2005 | |
| JP | 2006-253948 A | 9/2006 | |
| JP | 2007104112 A | 4/2007 | |
| JP | 2008-167337 A | 7/2008 | |
| JP | 2012-191529 A | 10/2012 | |
| RU | 2121767 C1 | 11/1998 | |
| WO | 2009/025035 A1 | 2/2009 | |

* cited by examiner

[FIG. 1]
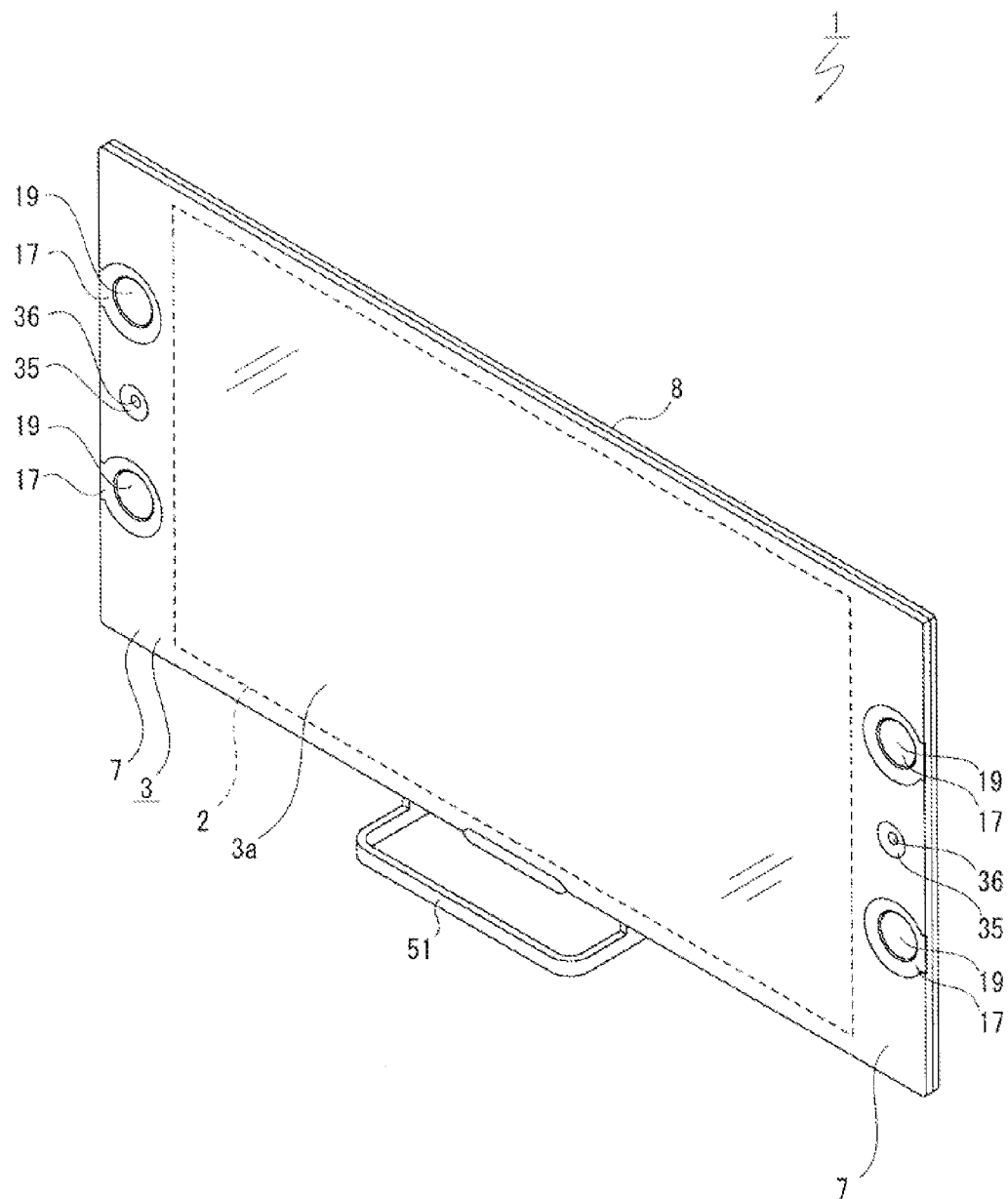

[FIG. 2]
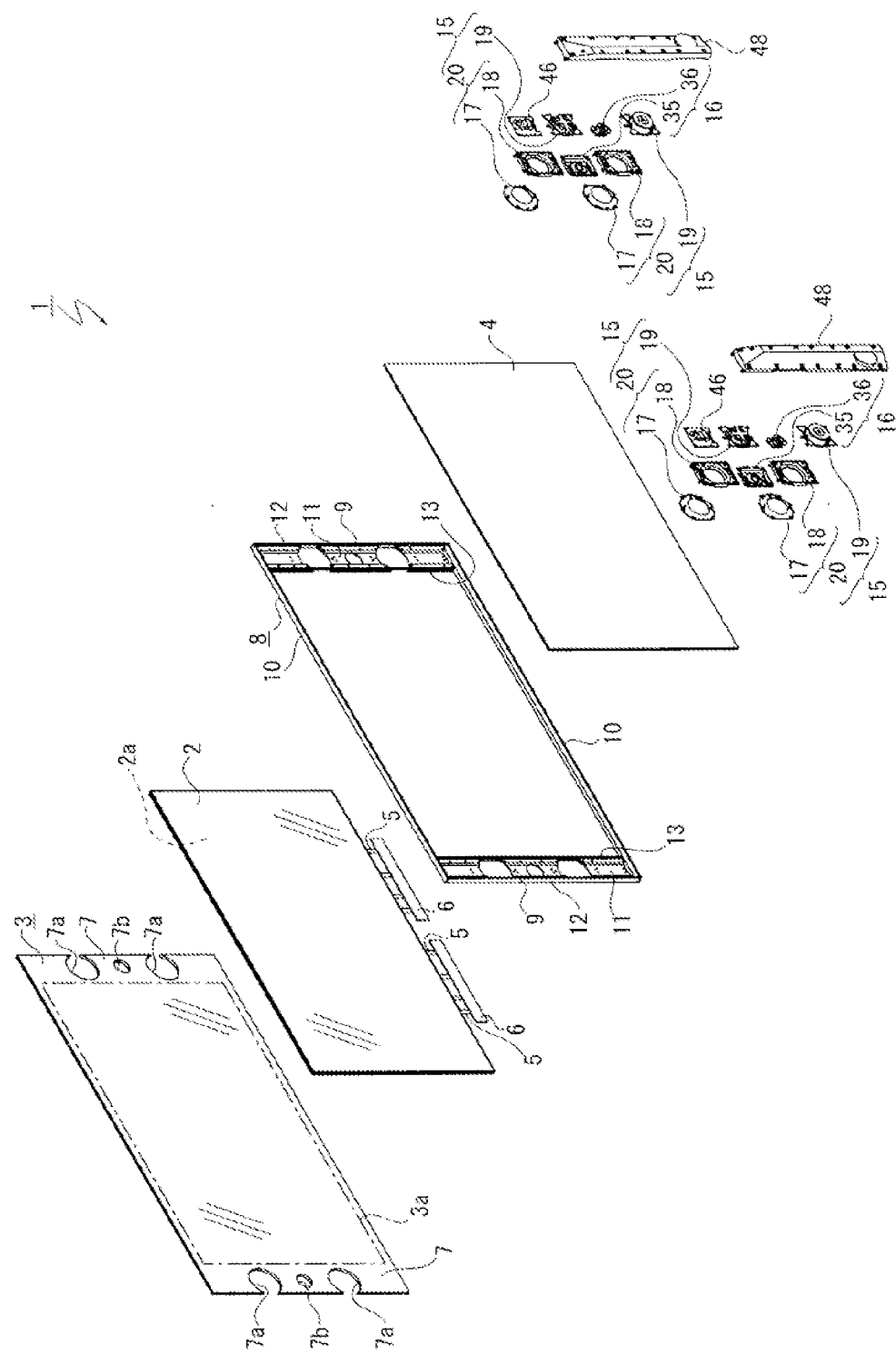

[ FIG. 3 ]
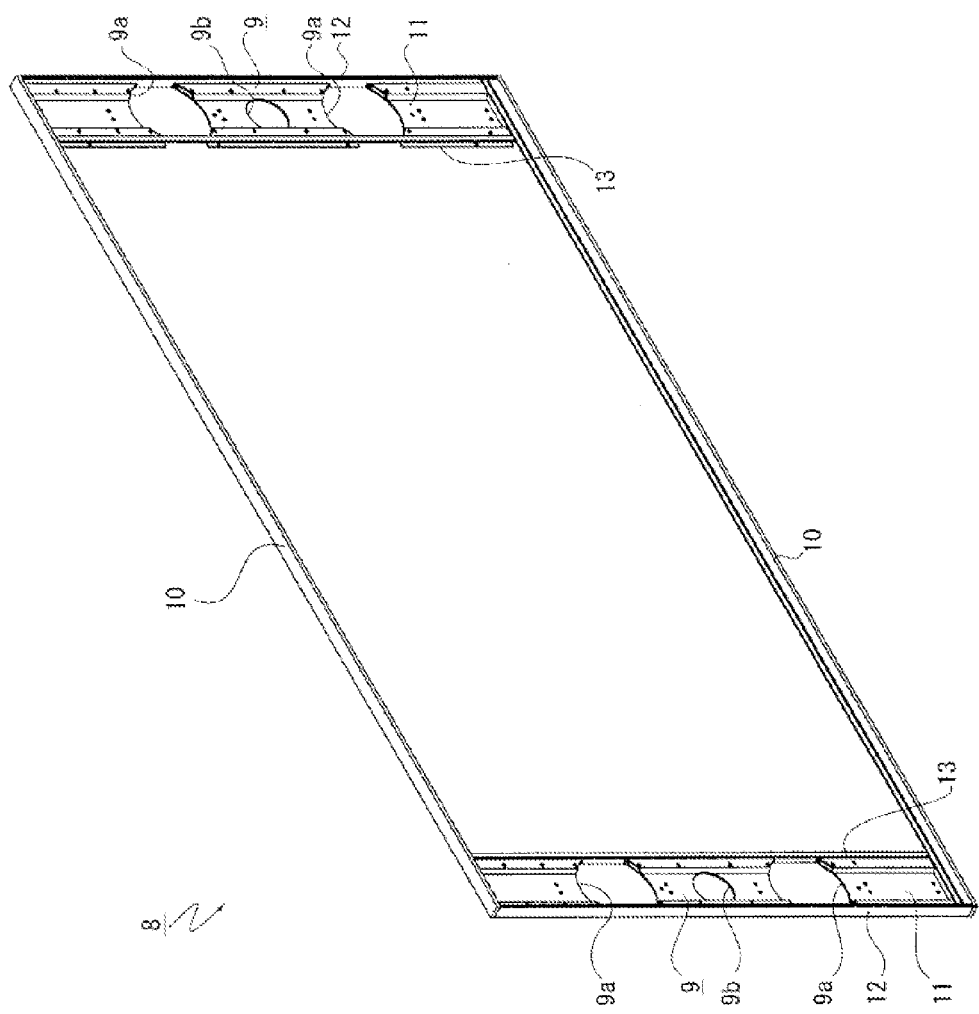

[FIG. 4]
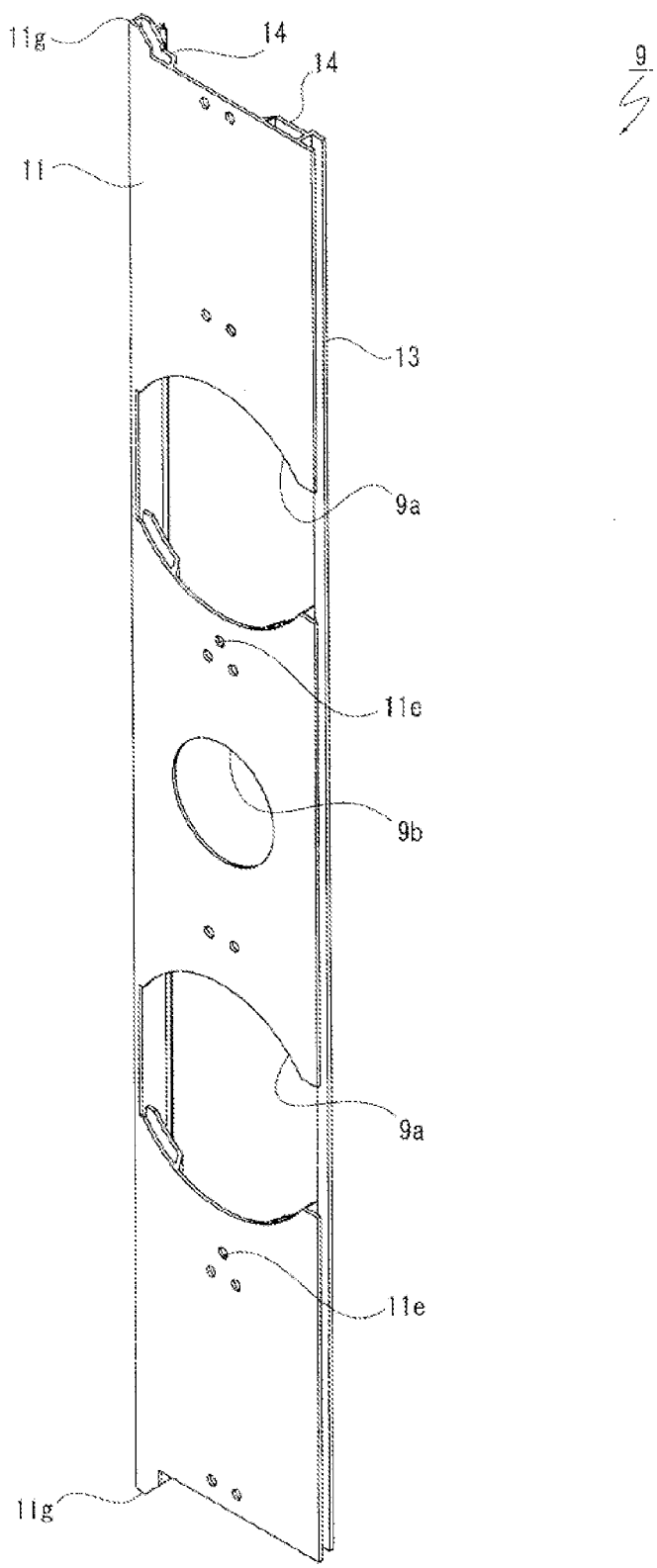

[FIG. 5]
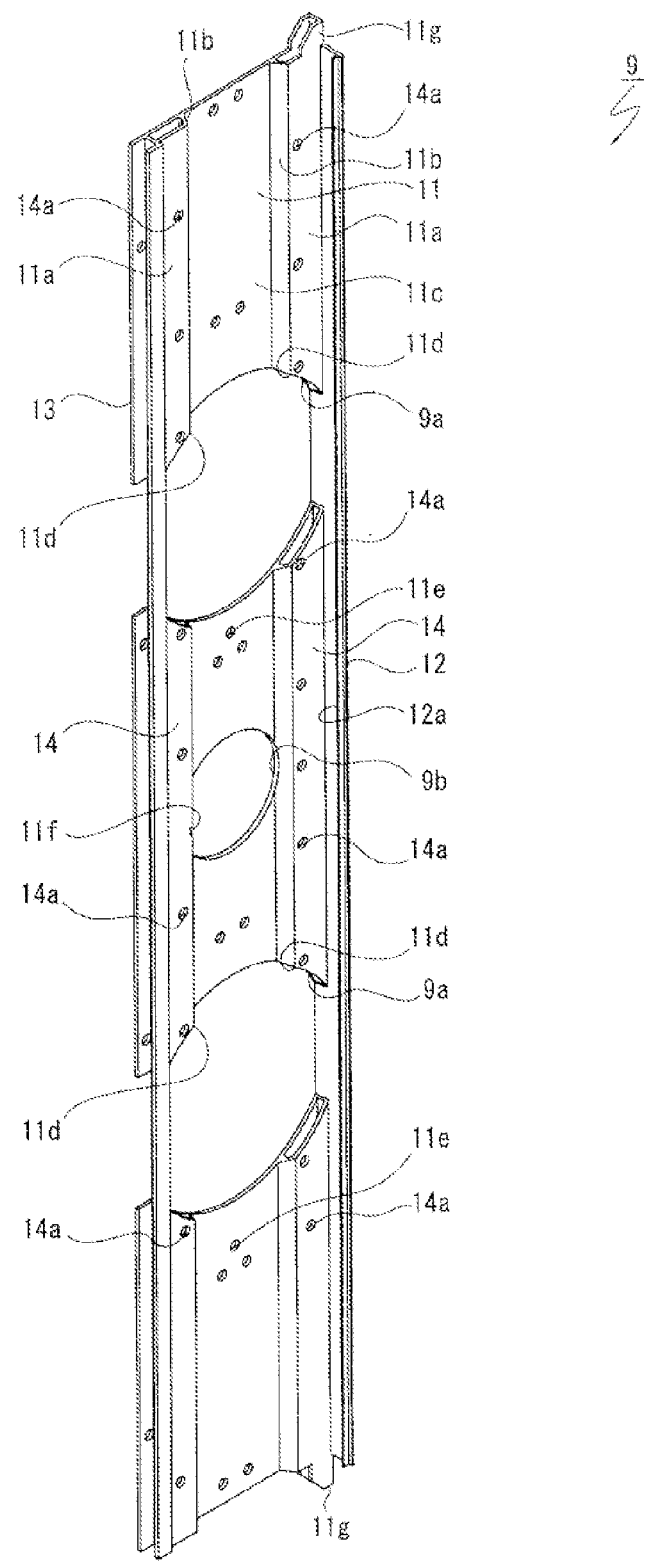

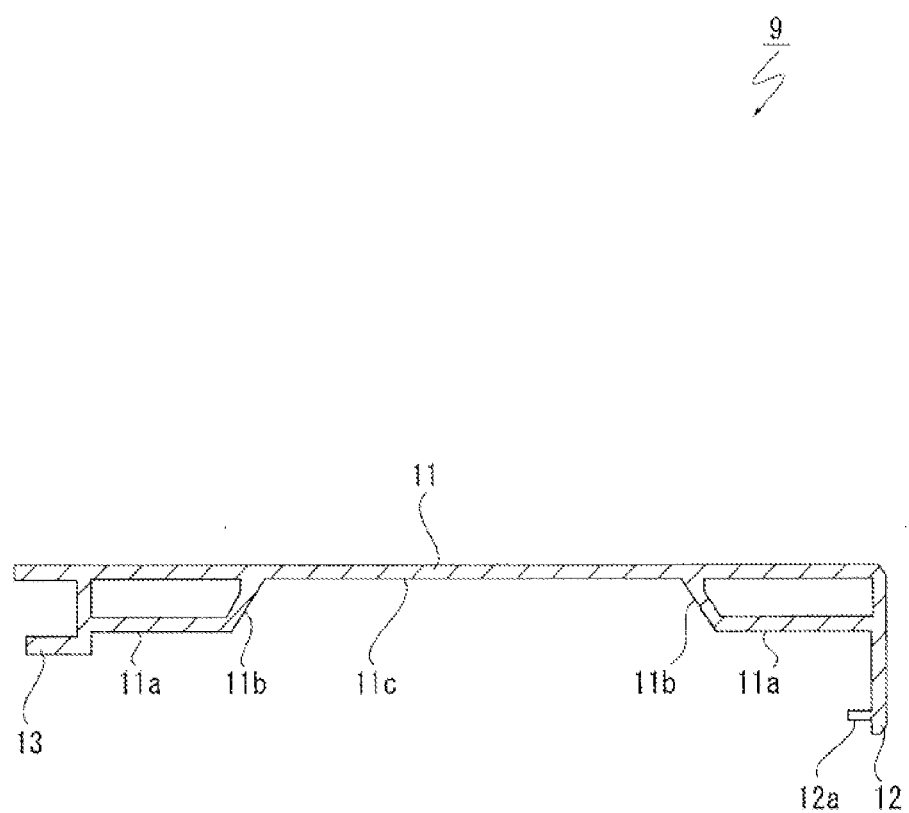

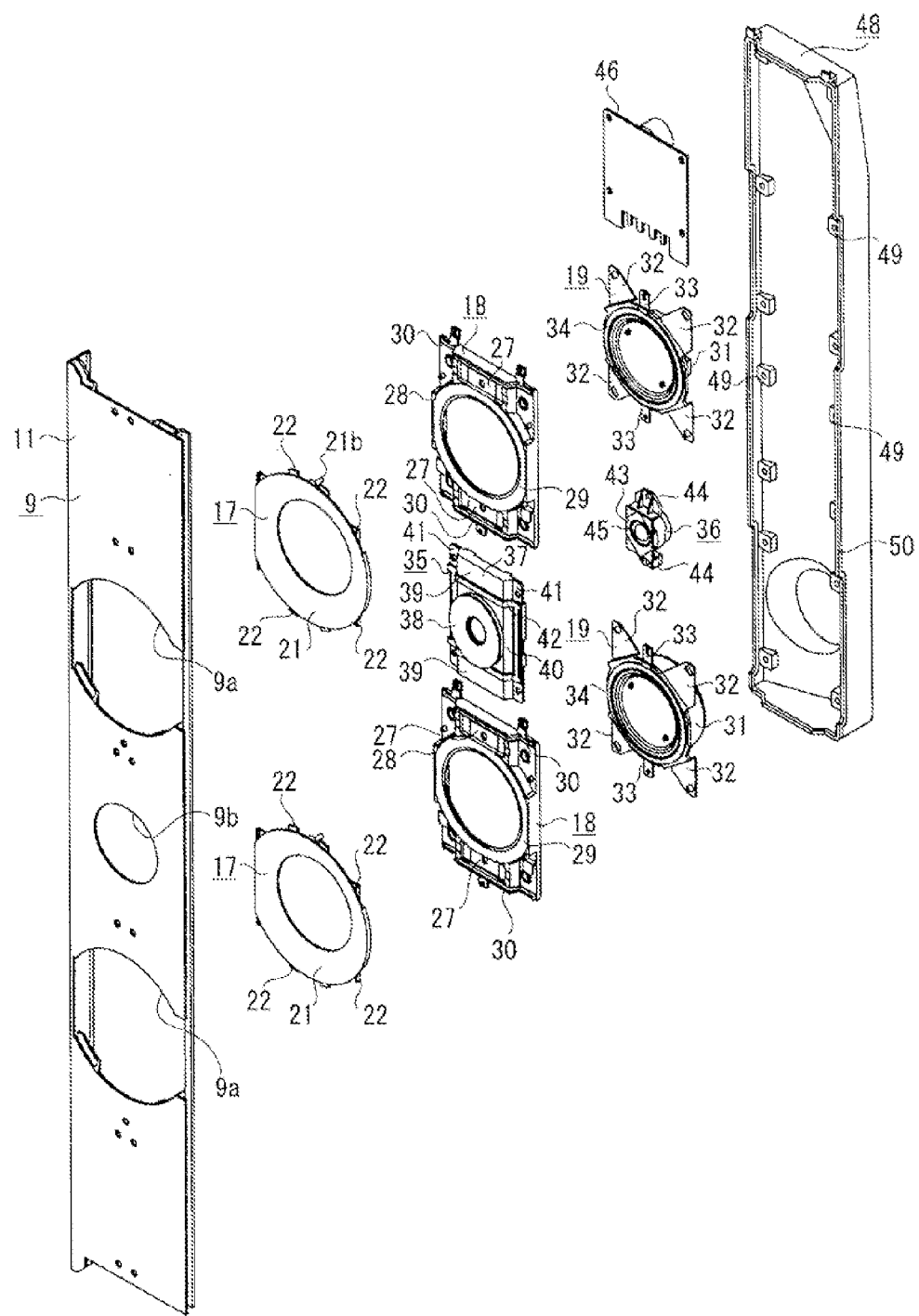
[FIG. 7]

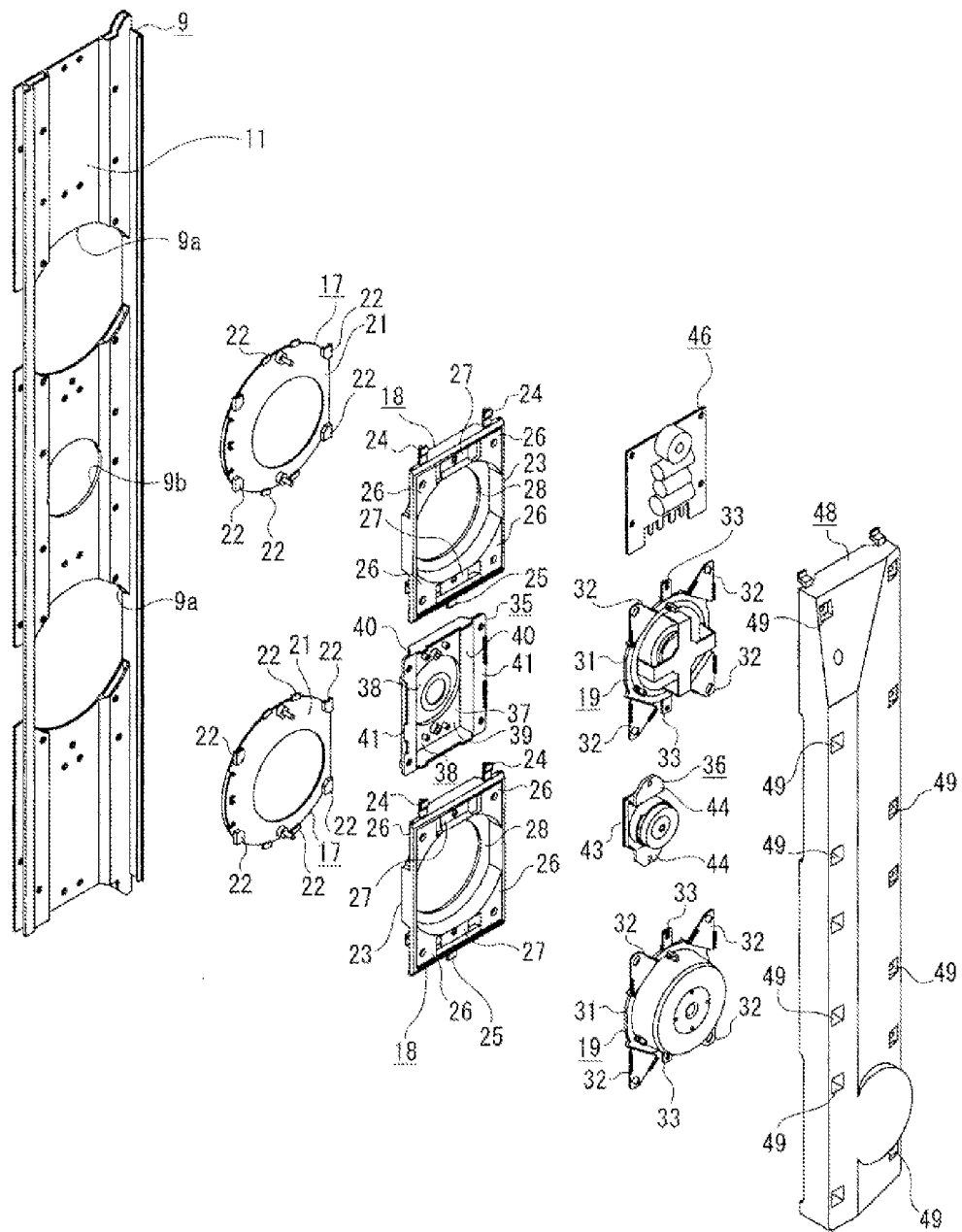
[FIG. 8]

[ FIG. 9 ]
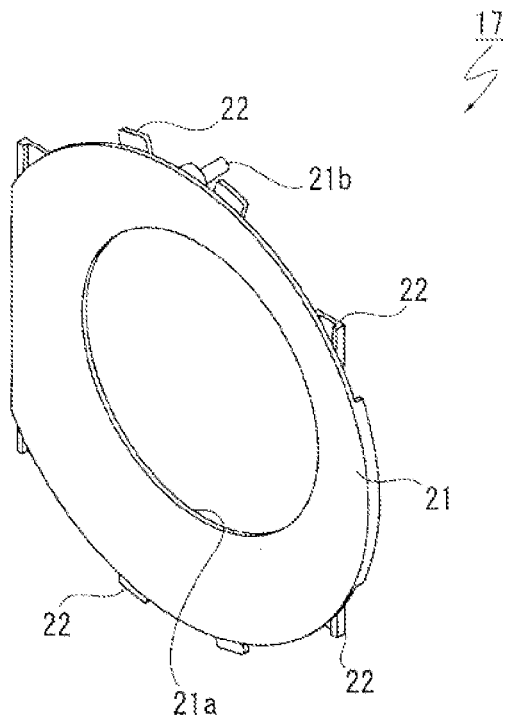
[ FIG. 10 ]
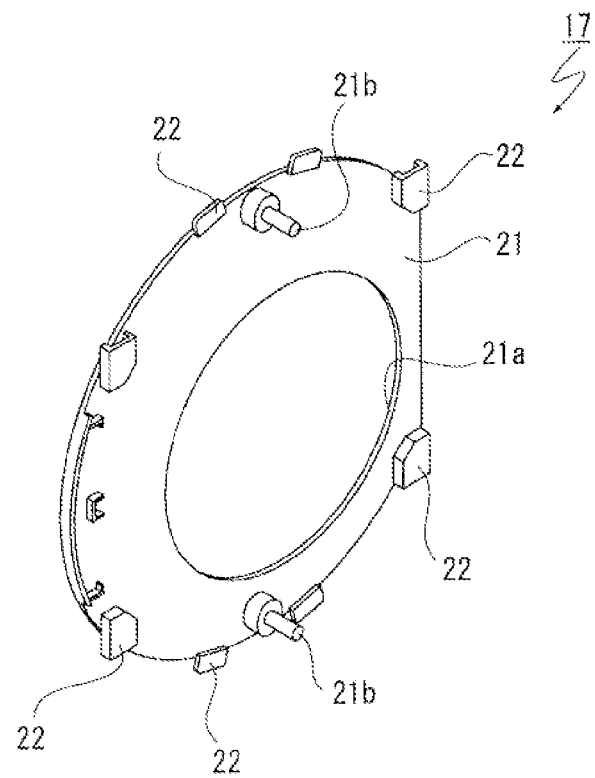

[ FIG. 11 ]
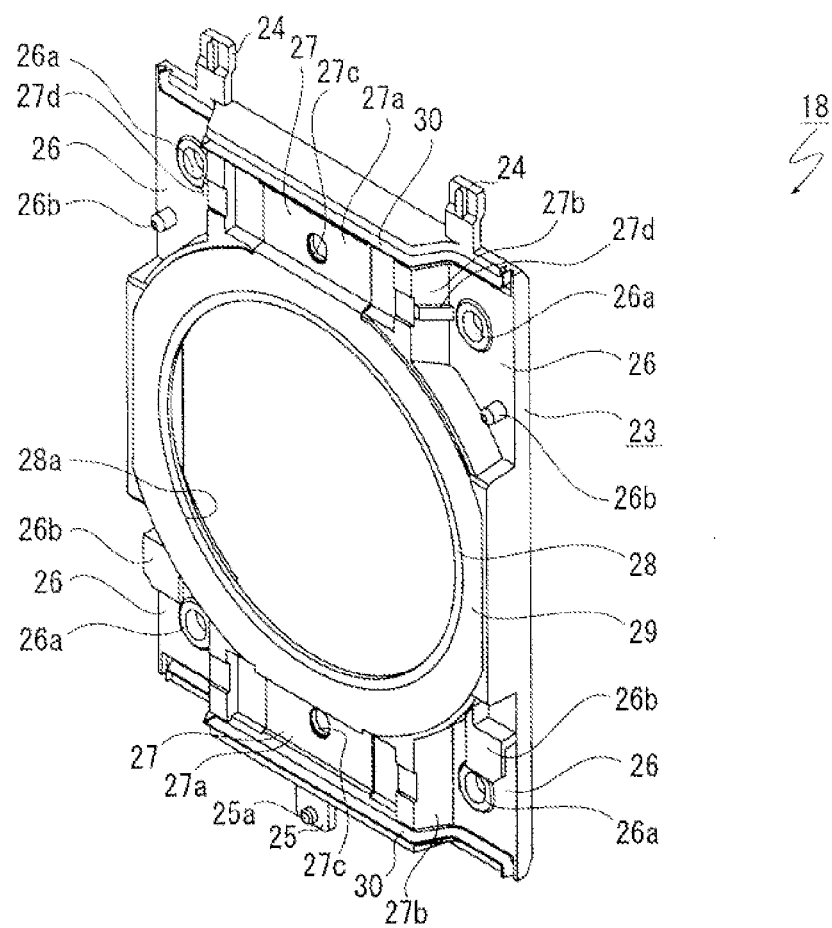

[ FIG. 12 ]
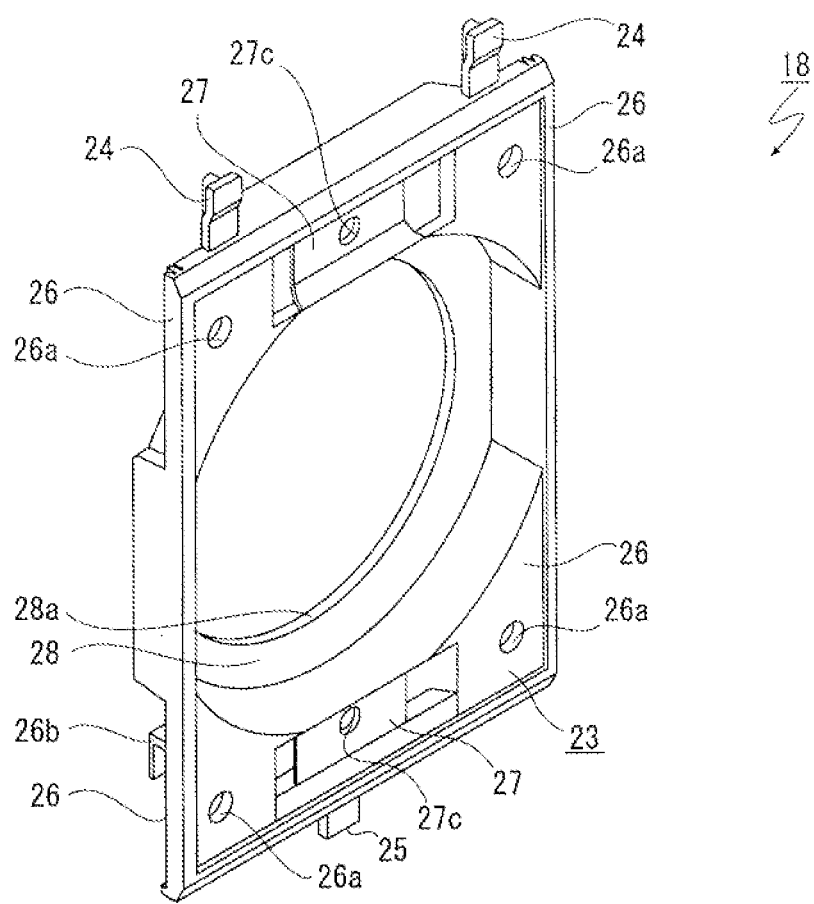

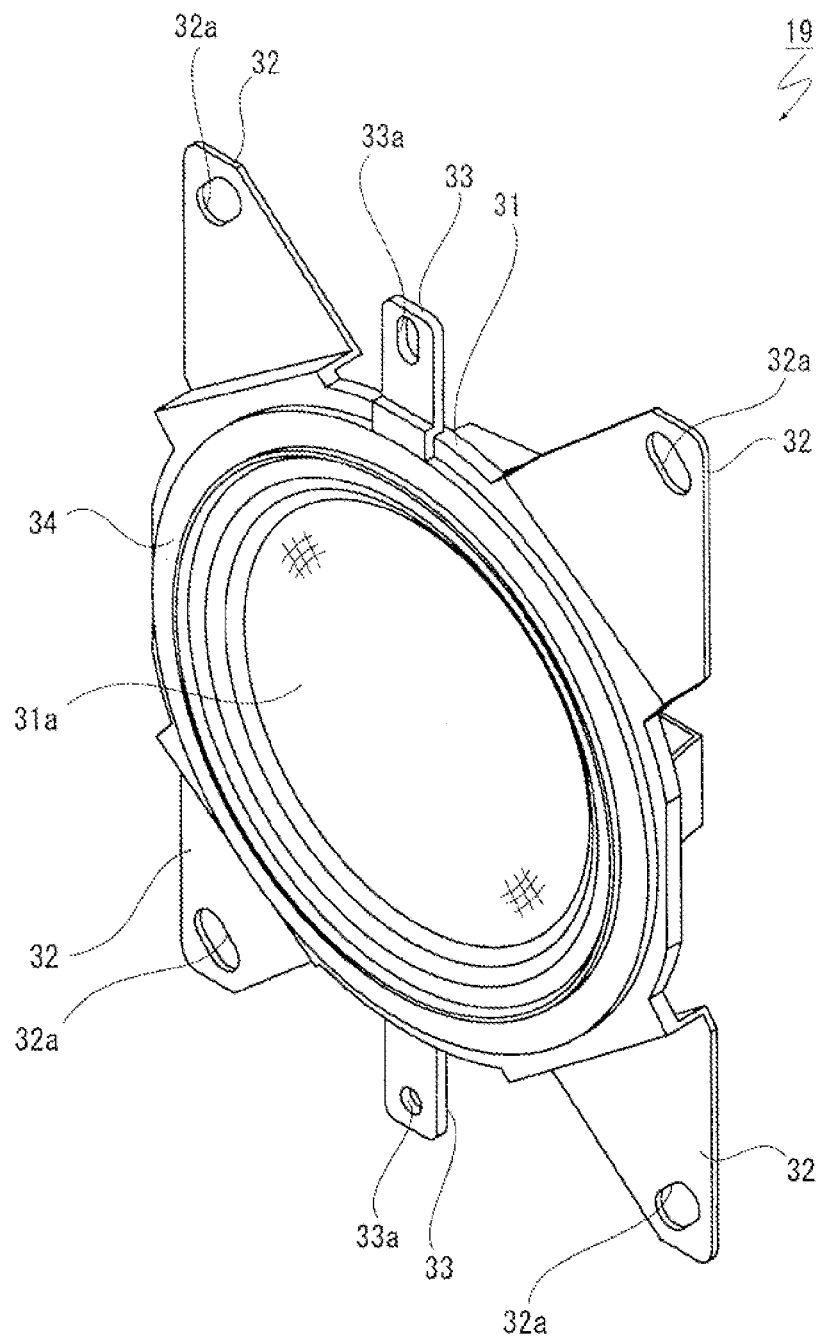
[ FIG. 13 ]

[ FIG. 14 ]
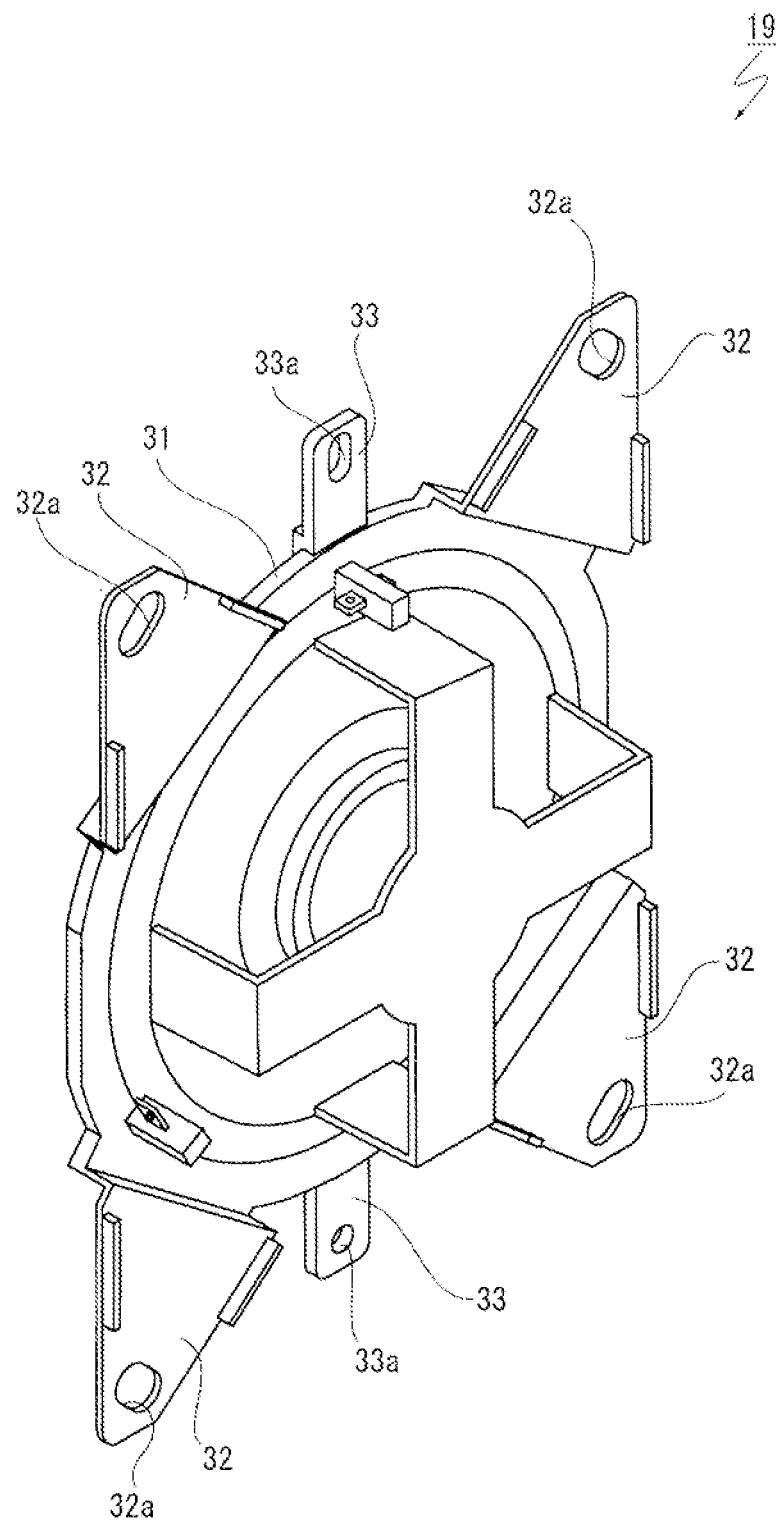

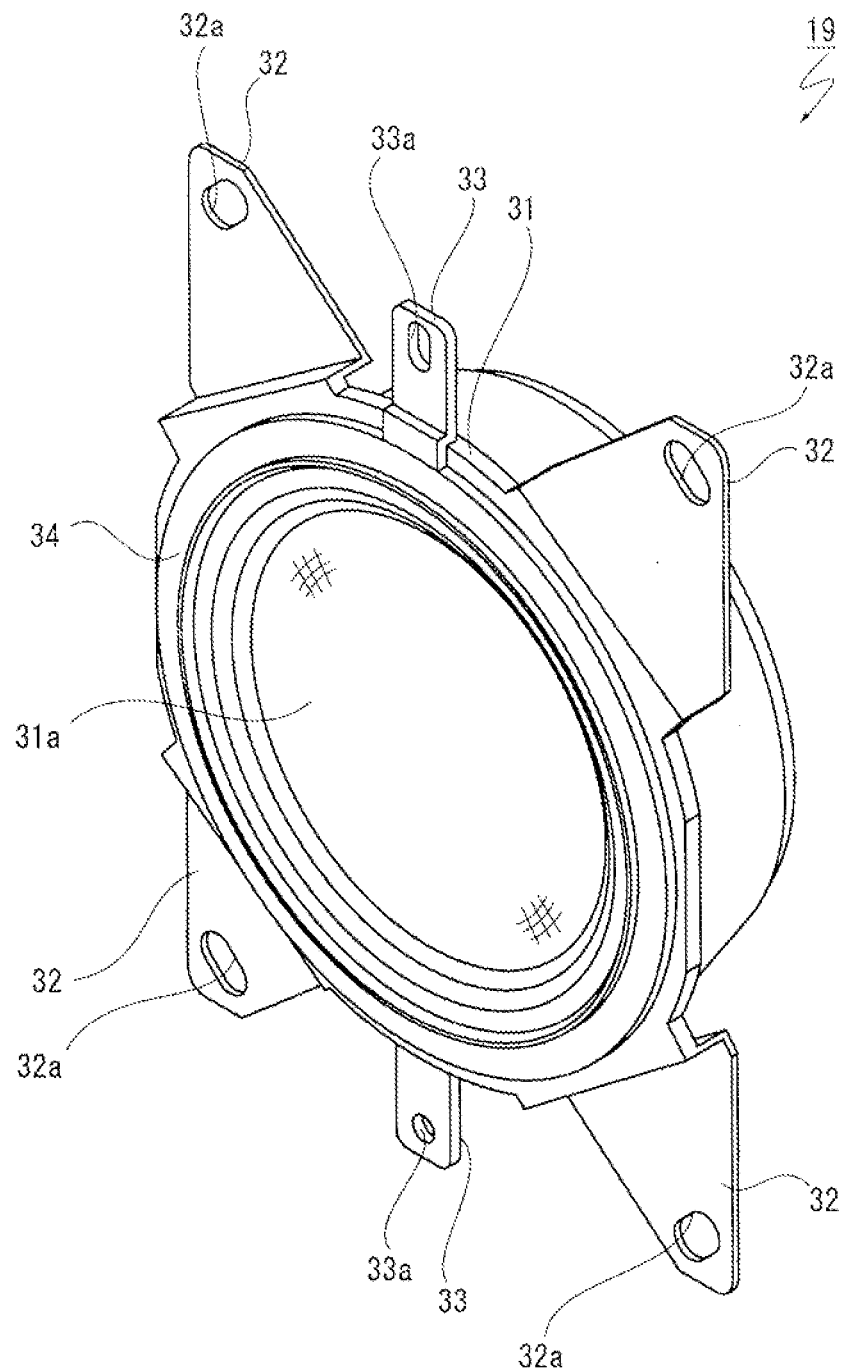
[FIG. 15]

[ FIG. 16 ]
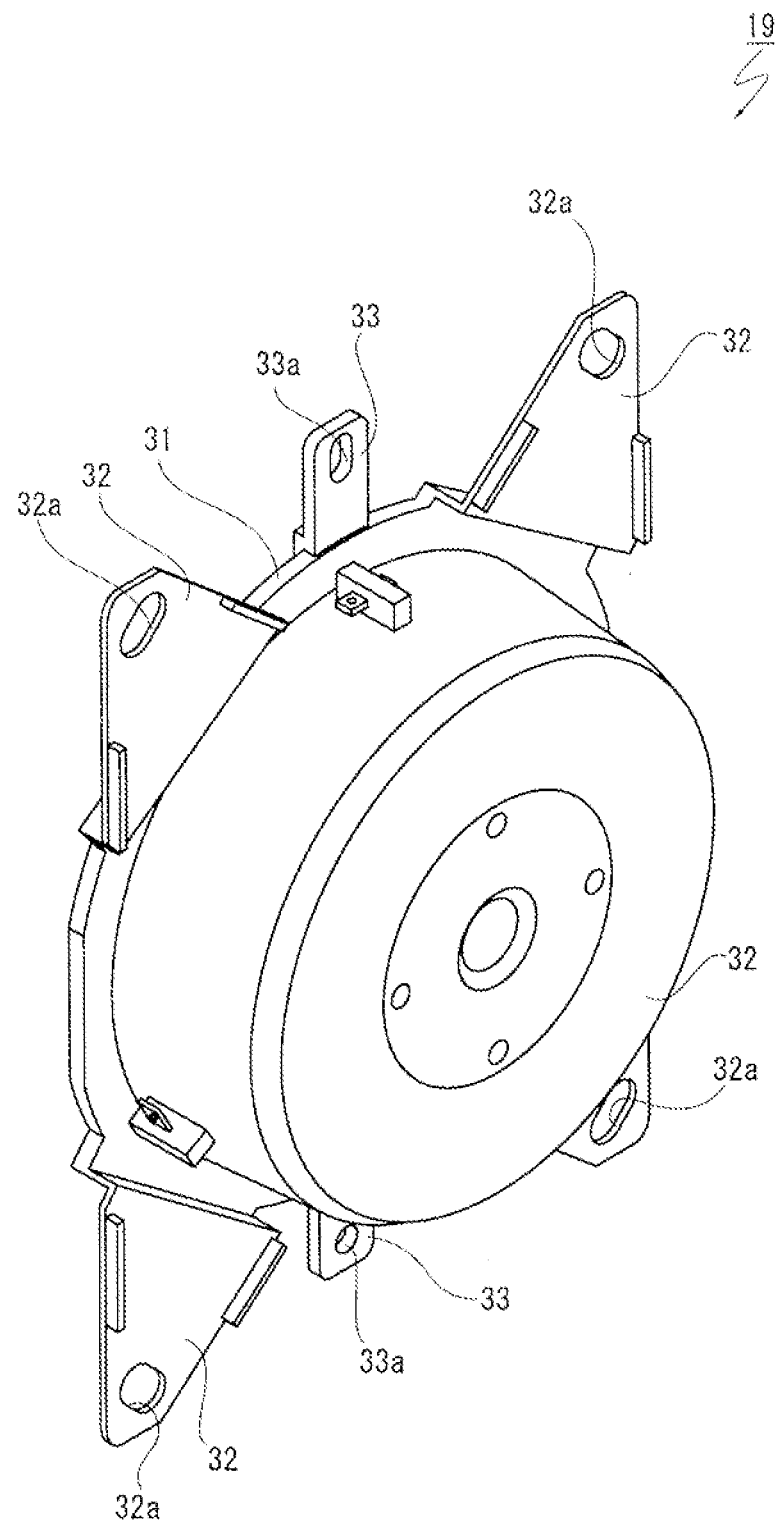

[ FIG. 17 ]
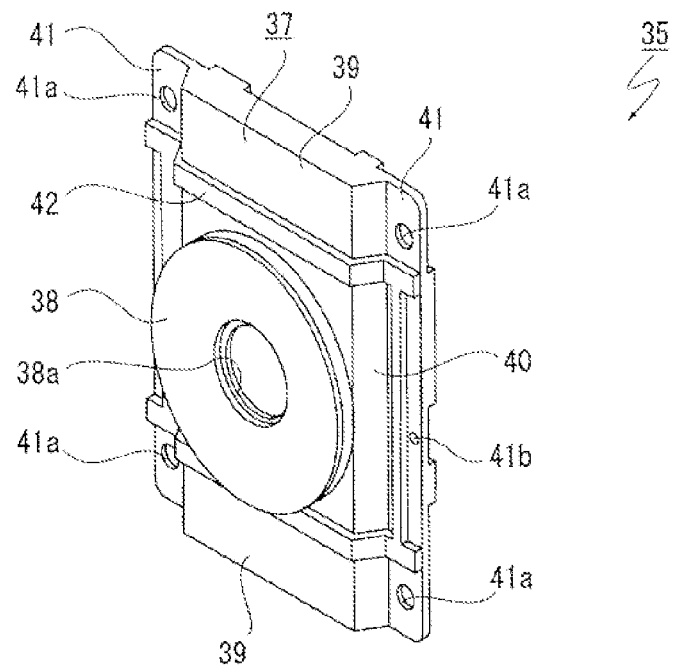
[ FIG. 18 ]
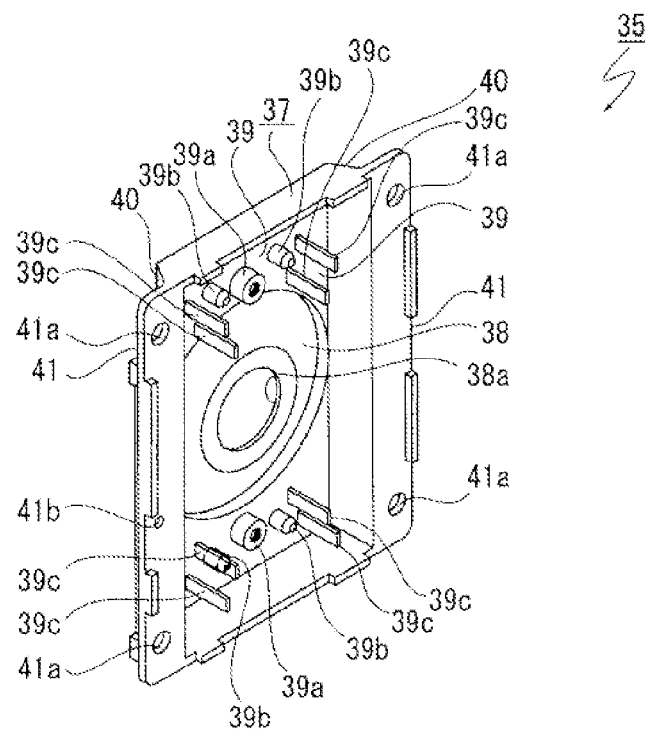

[ FIG. 19 ]
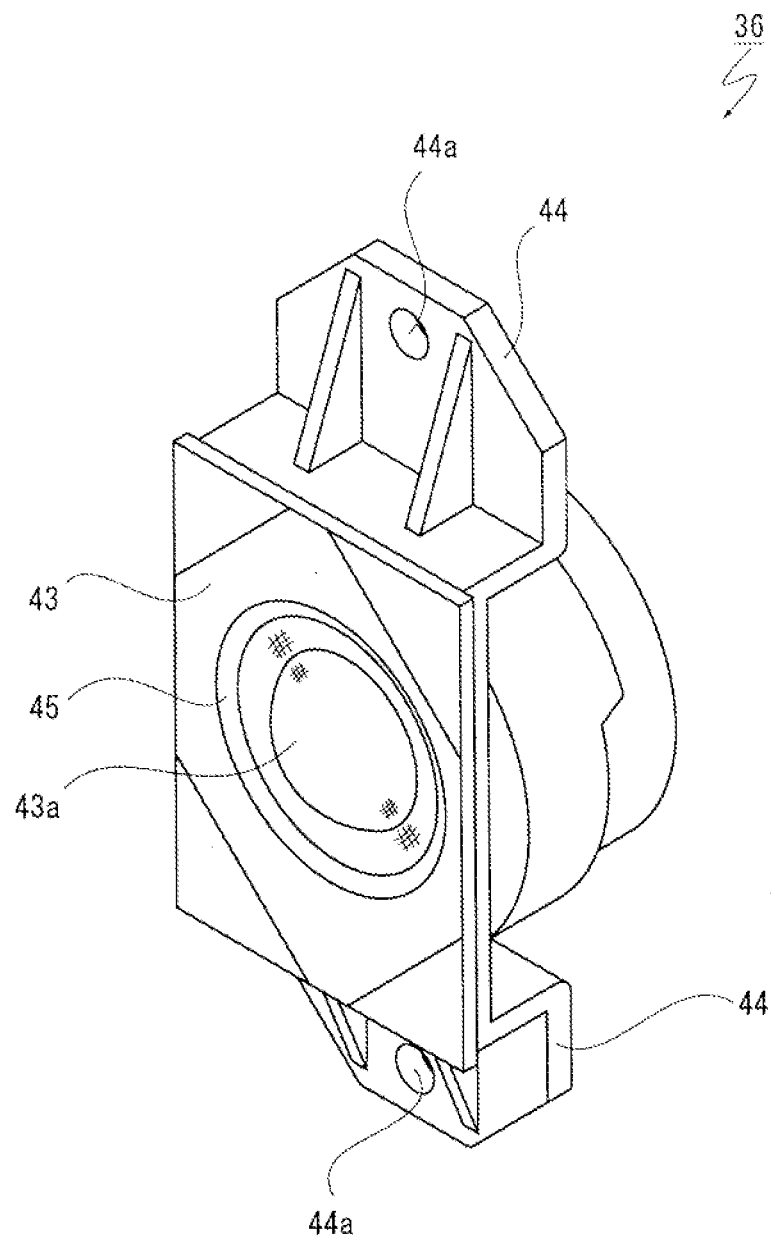

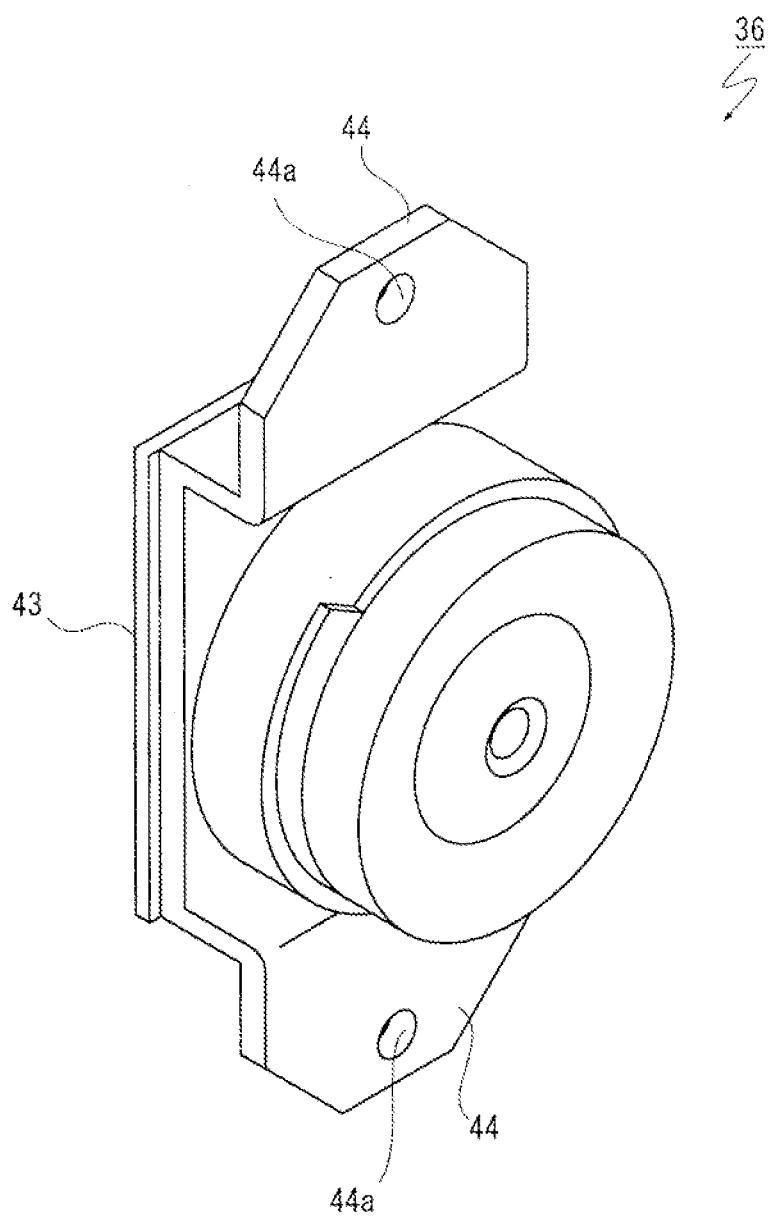
[ FIG. 20 ]

[FIG. 21]
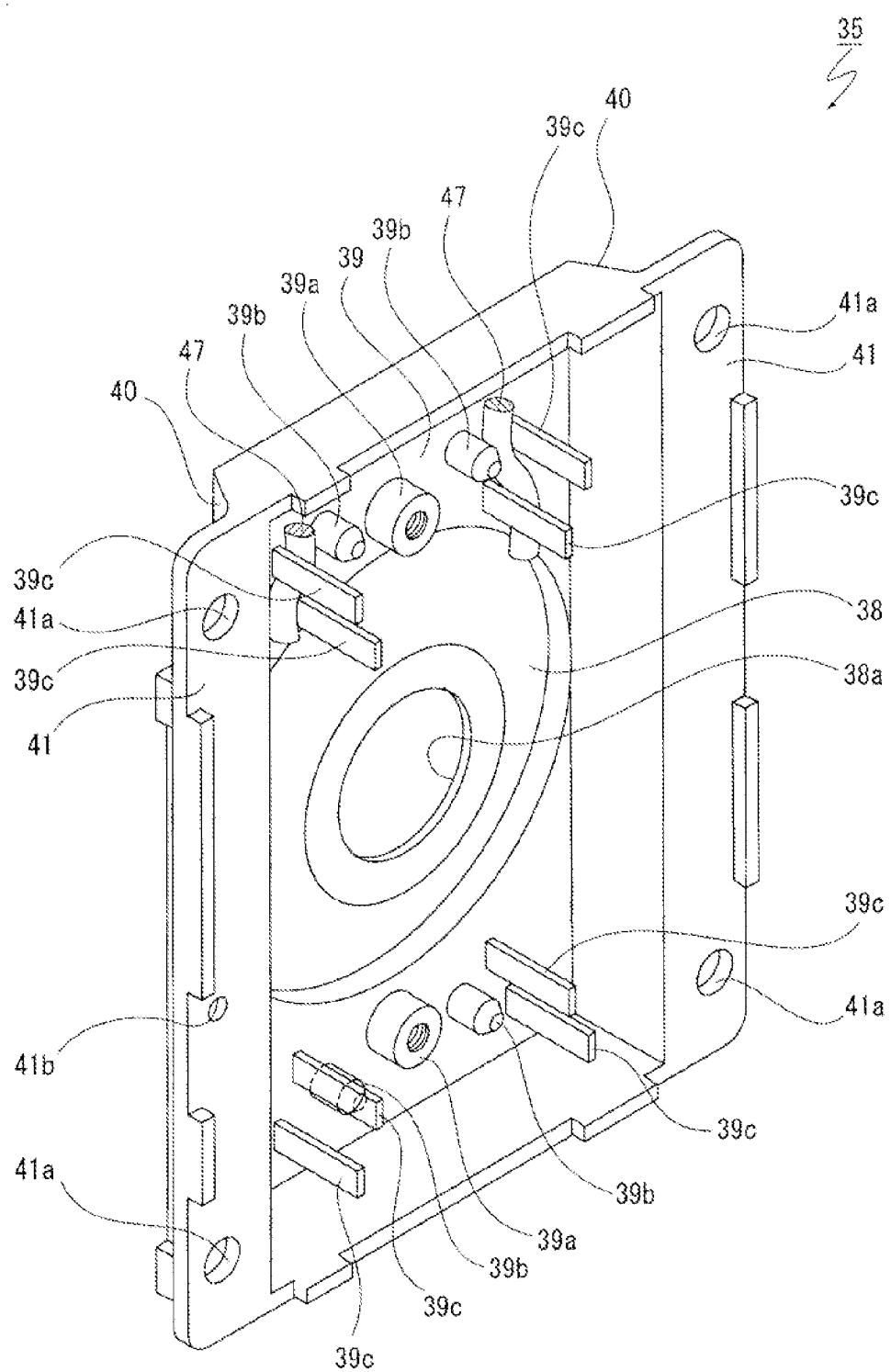

[ FIG. 22 ]
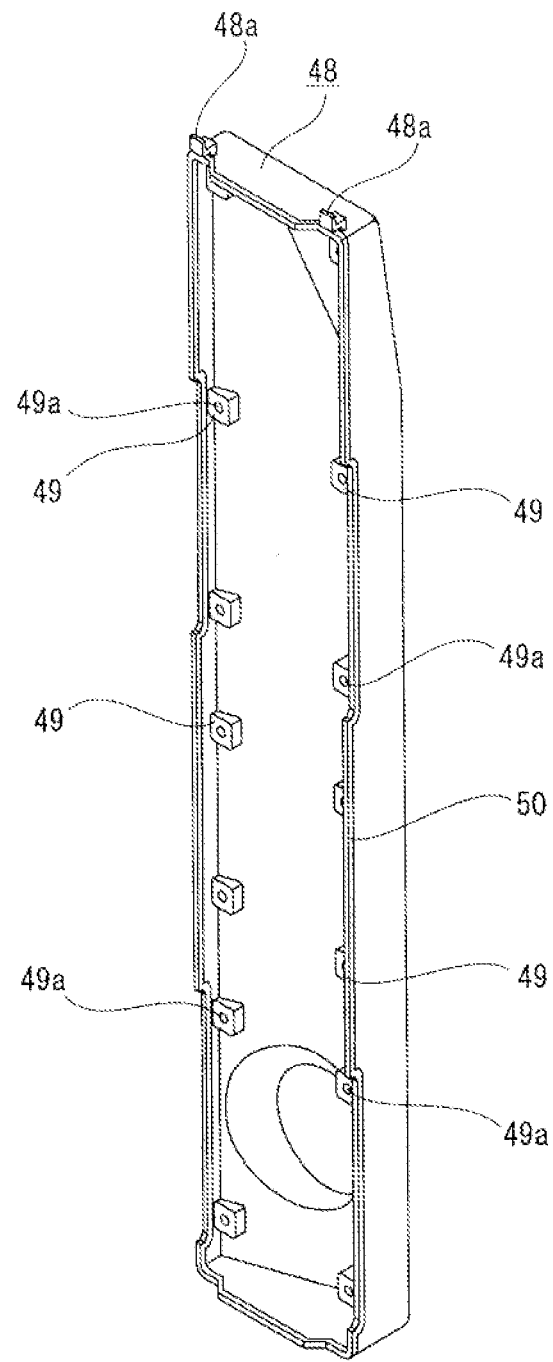

[ FIG. 23 ]
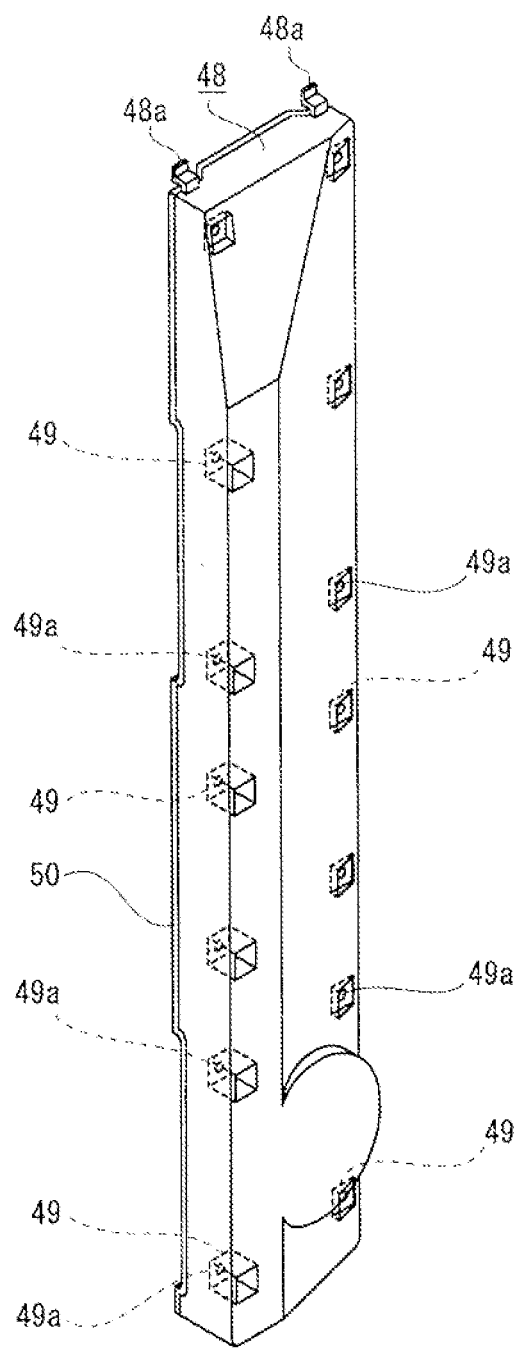

[FIG. 24]
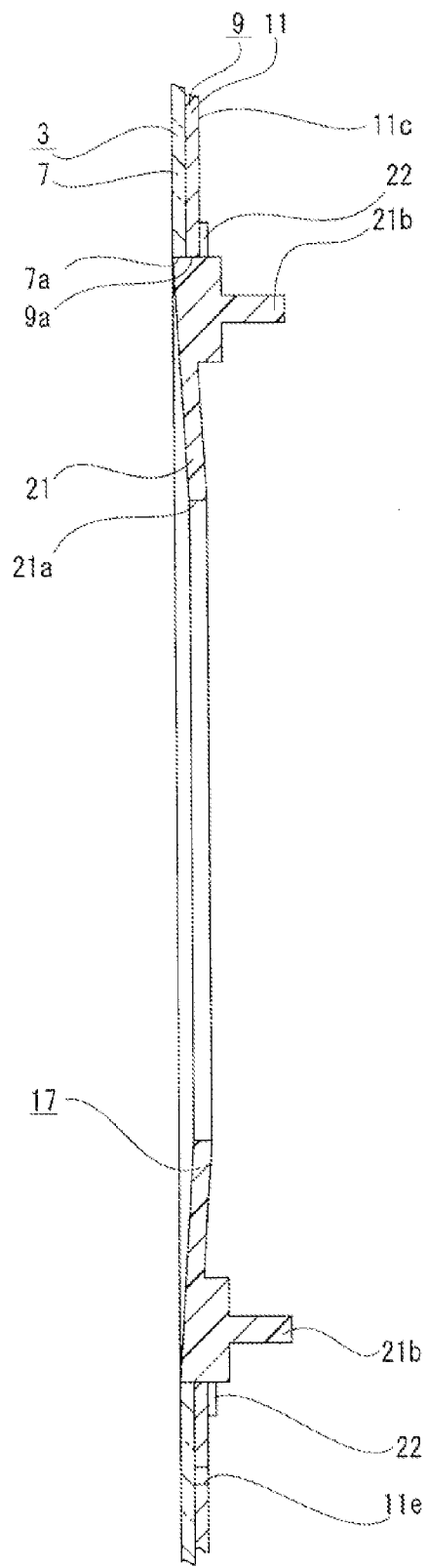

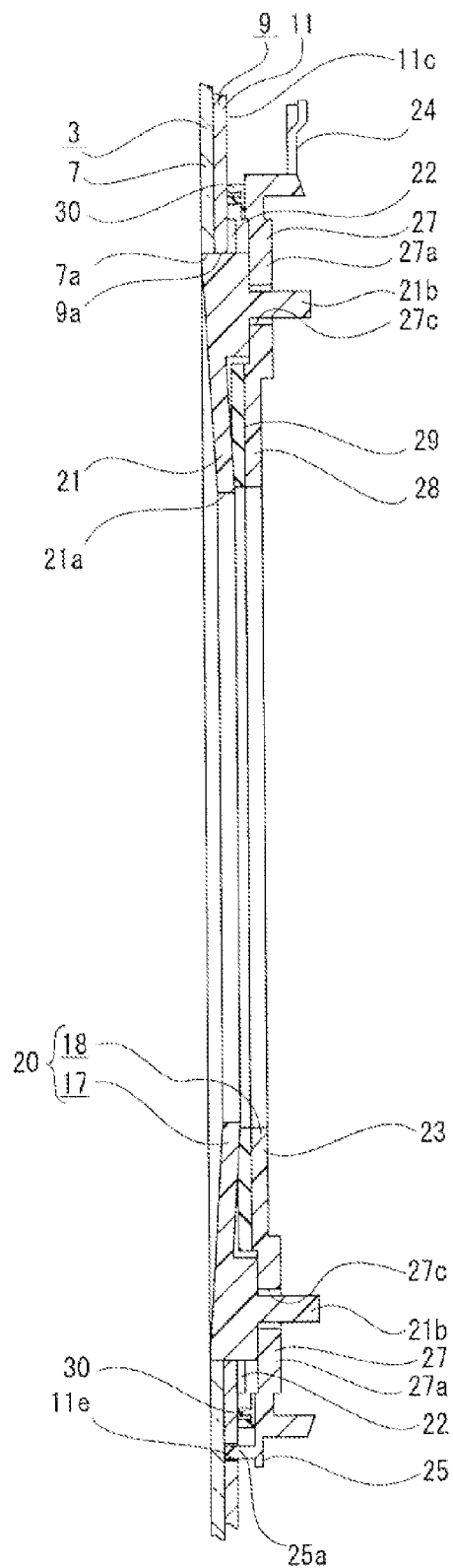
[FIG. 25]

[ FIG. 26 ]
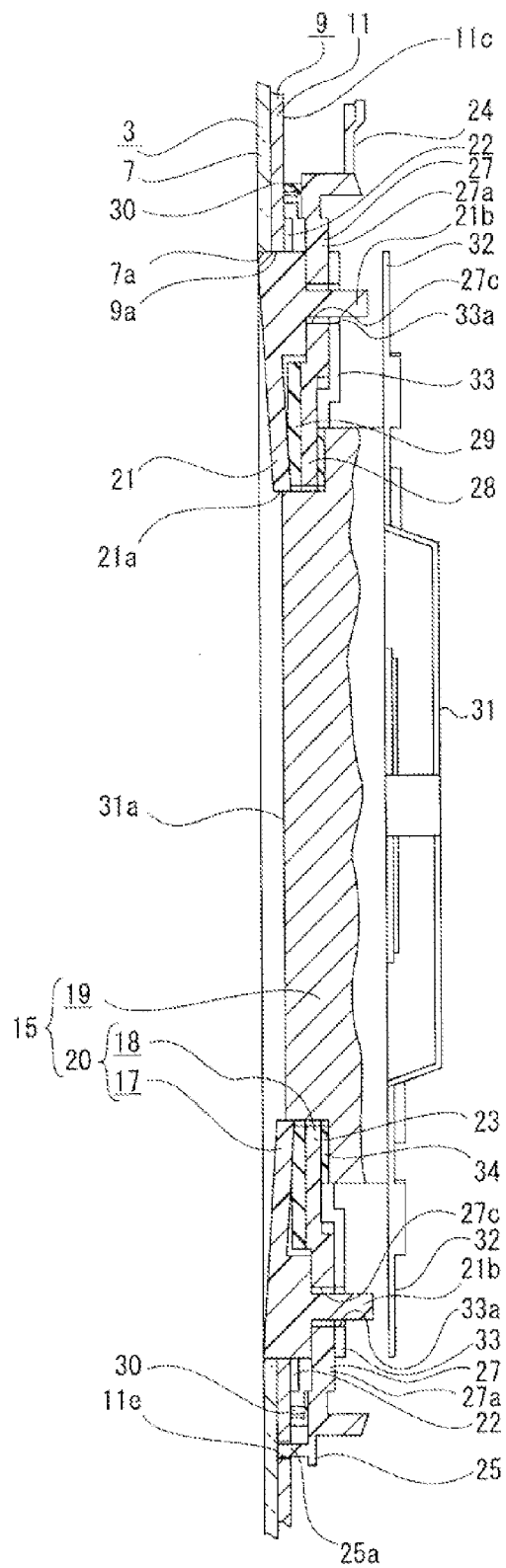

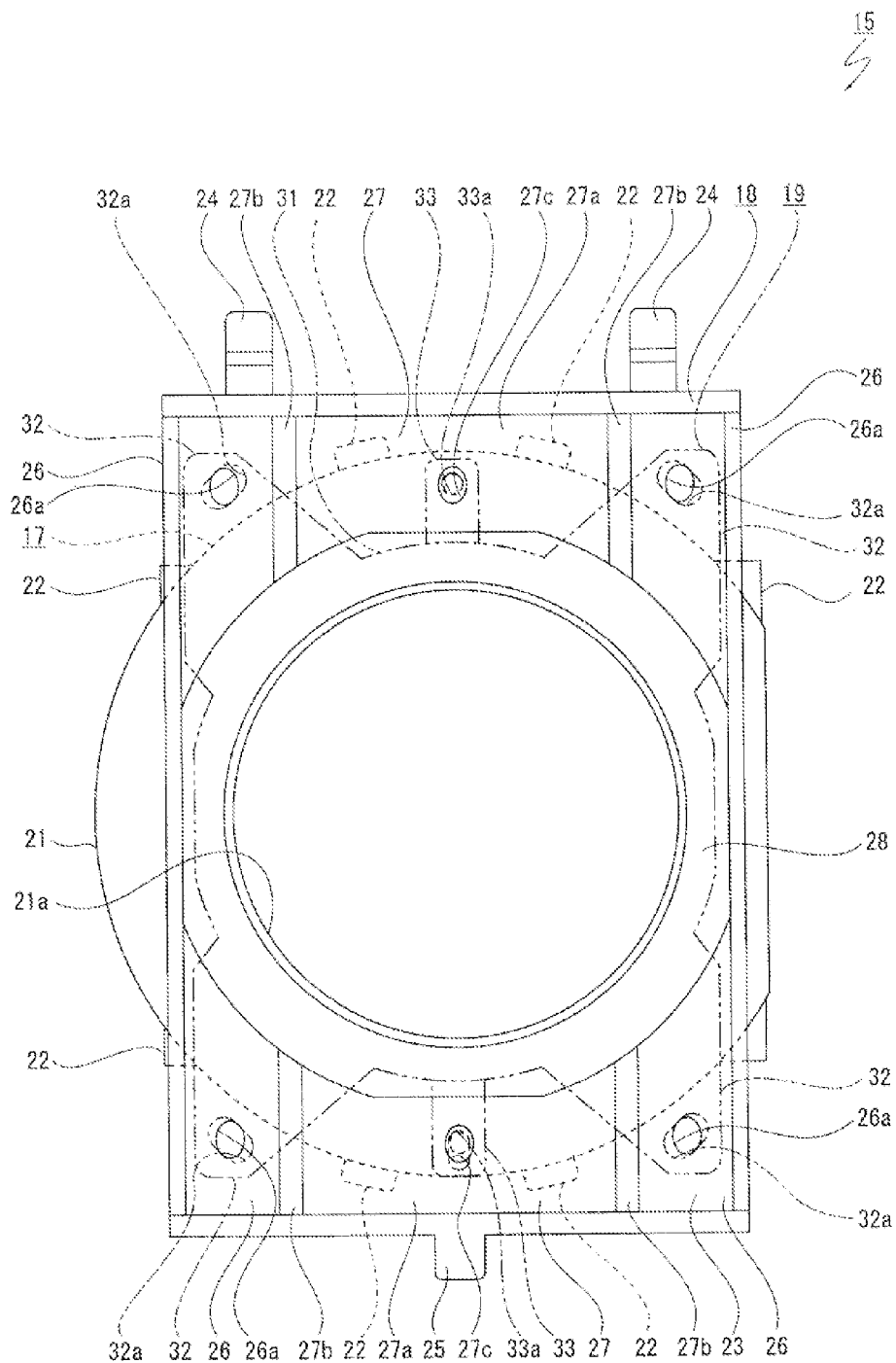
[FIG. 27]

[ FIG. 28 ]
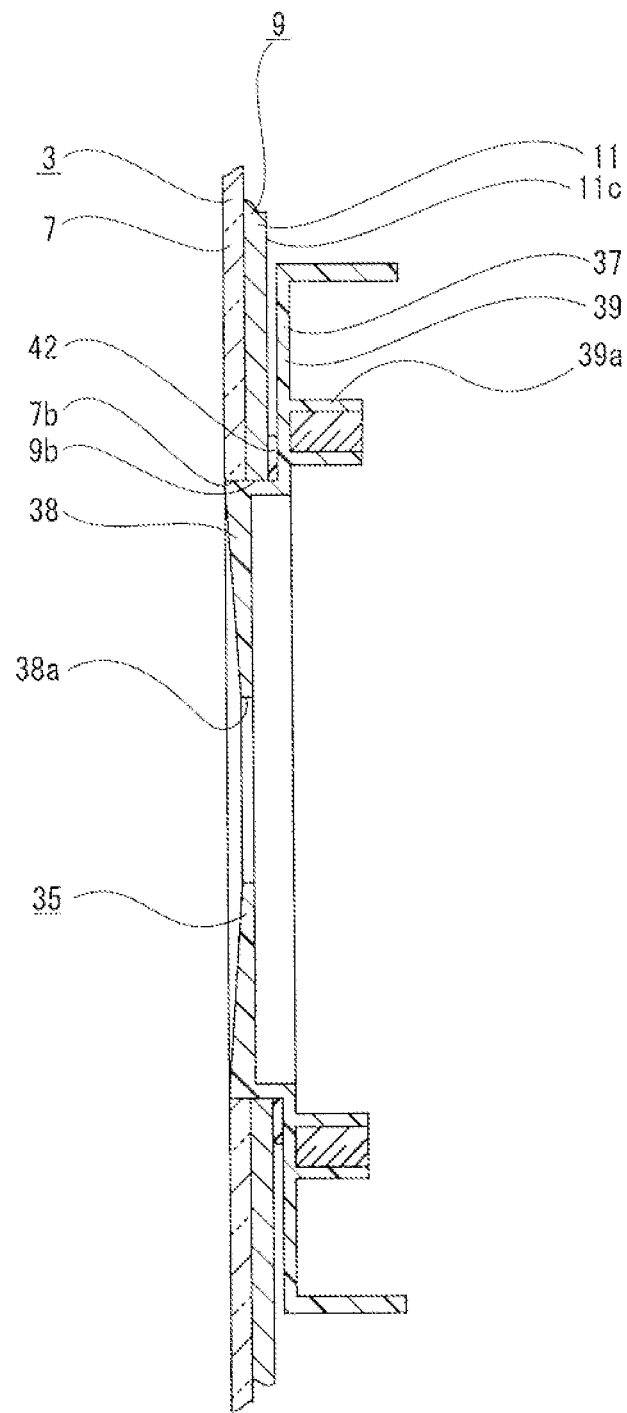

[FIG. 29]
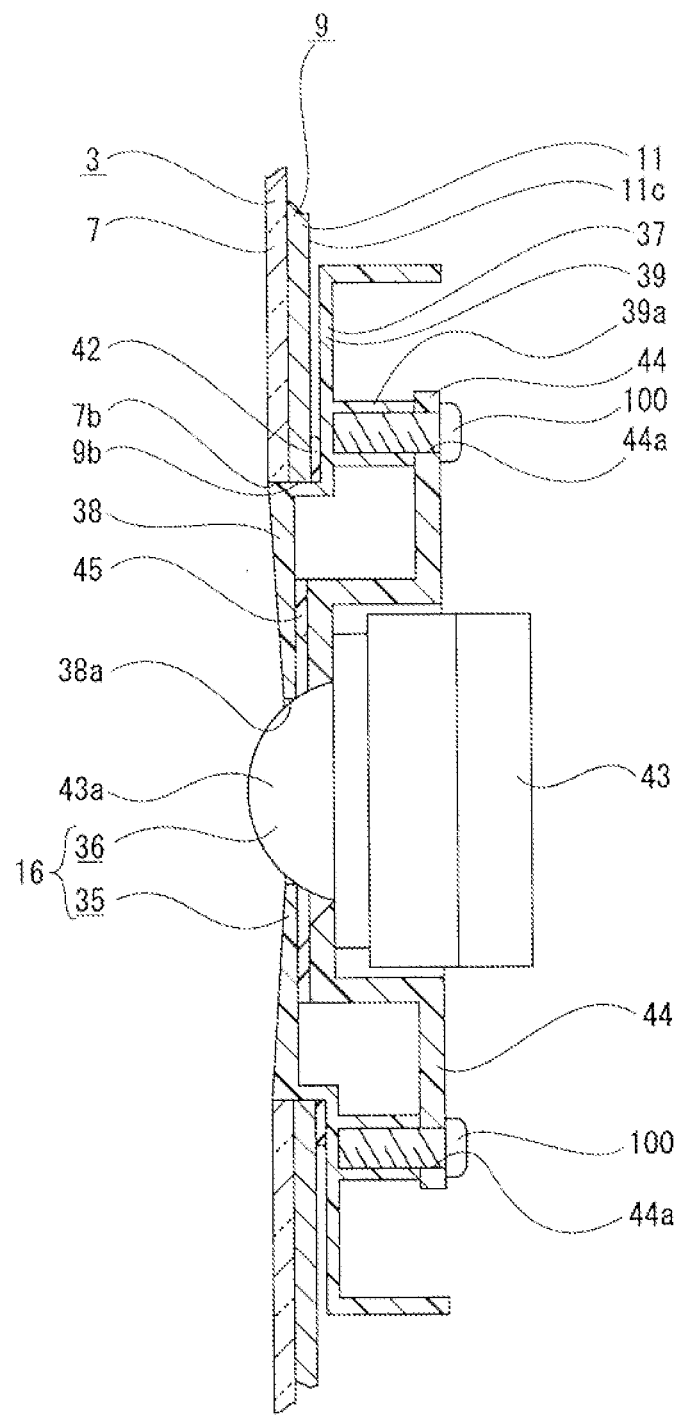

[FIG. 30]
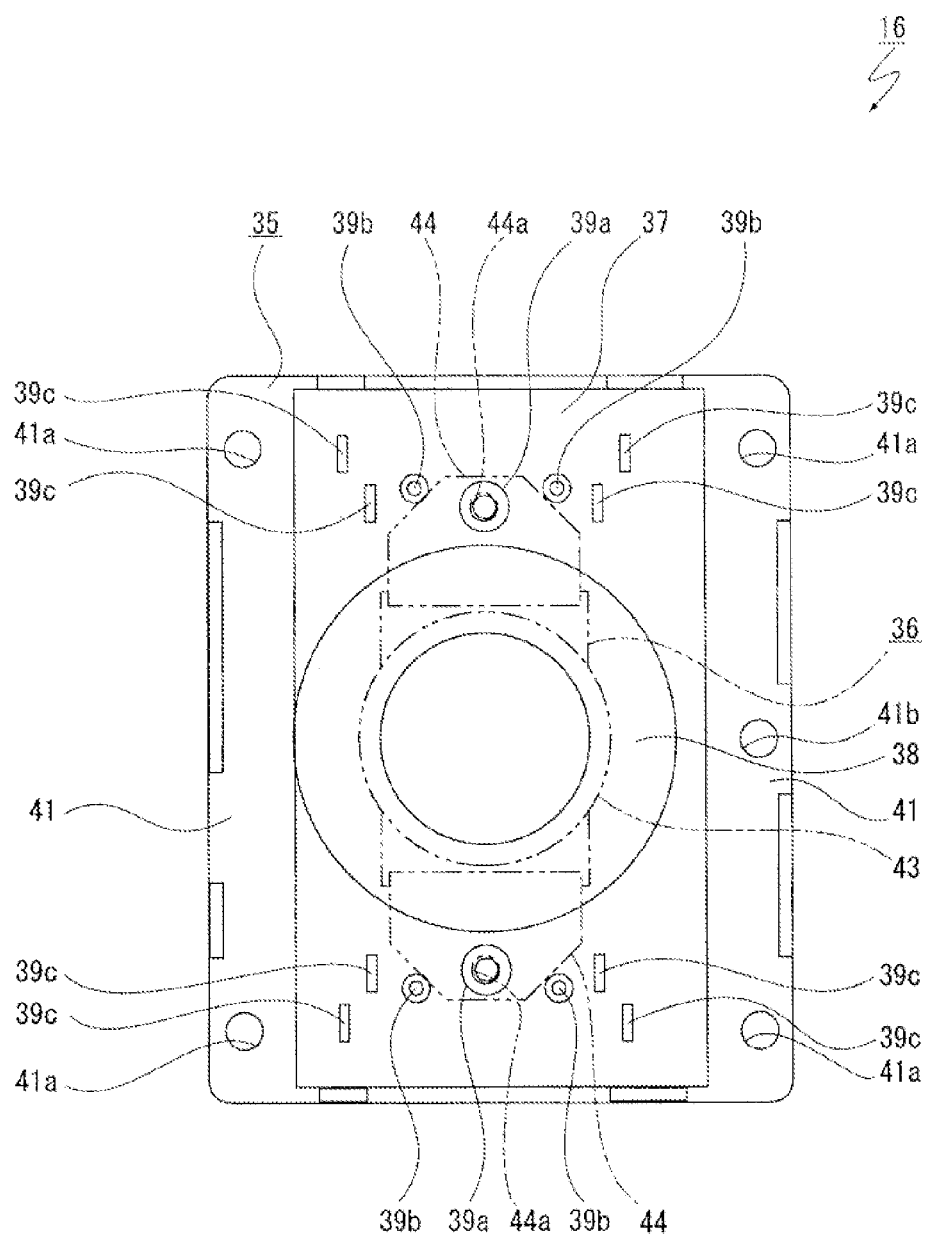

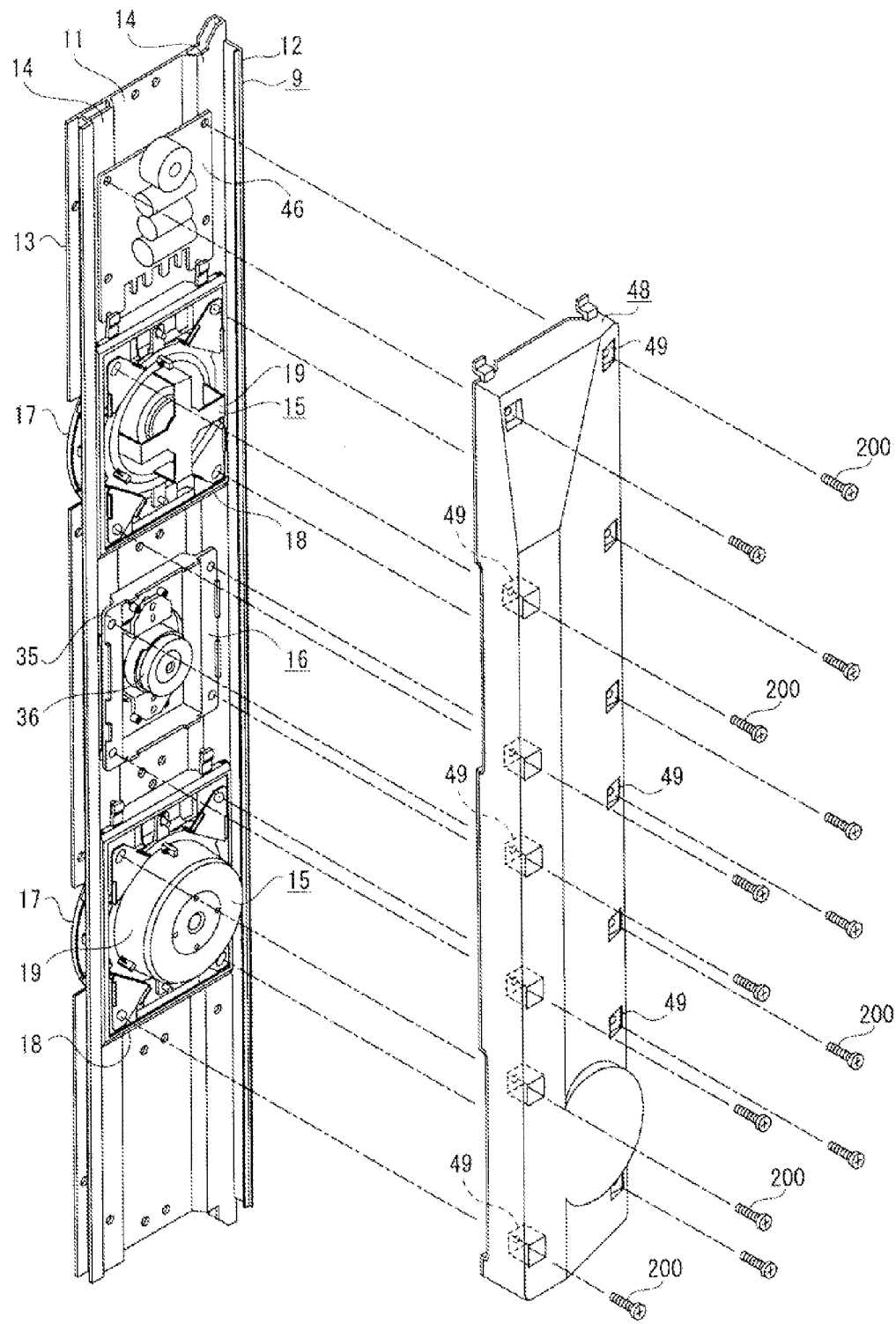
[FIG. 31]

[ FIG. 32 ]
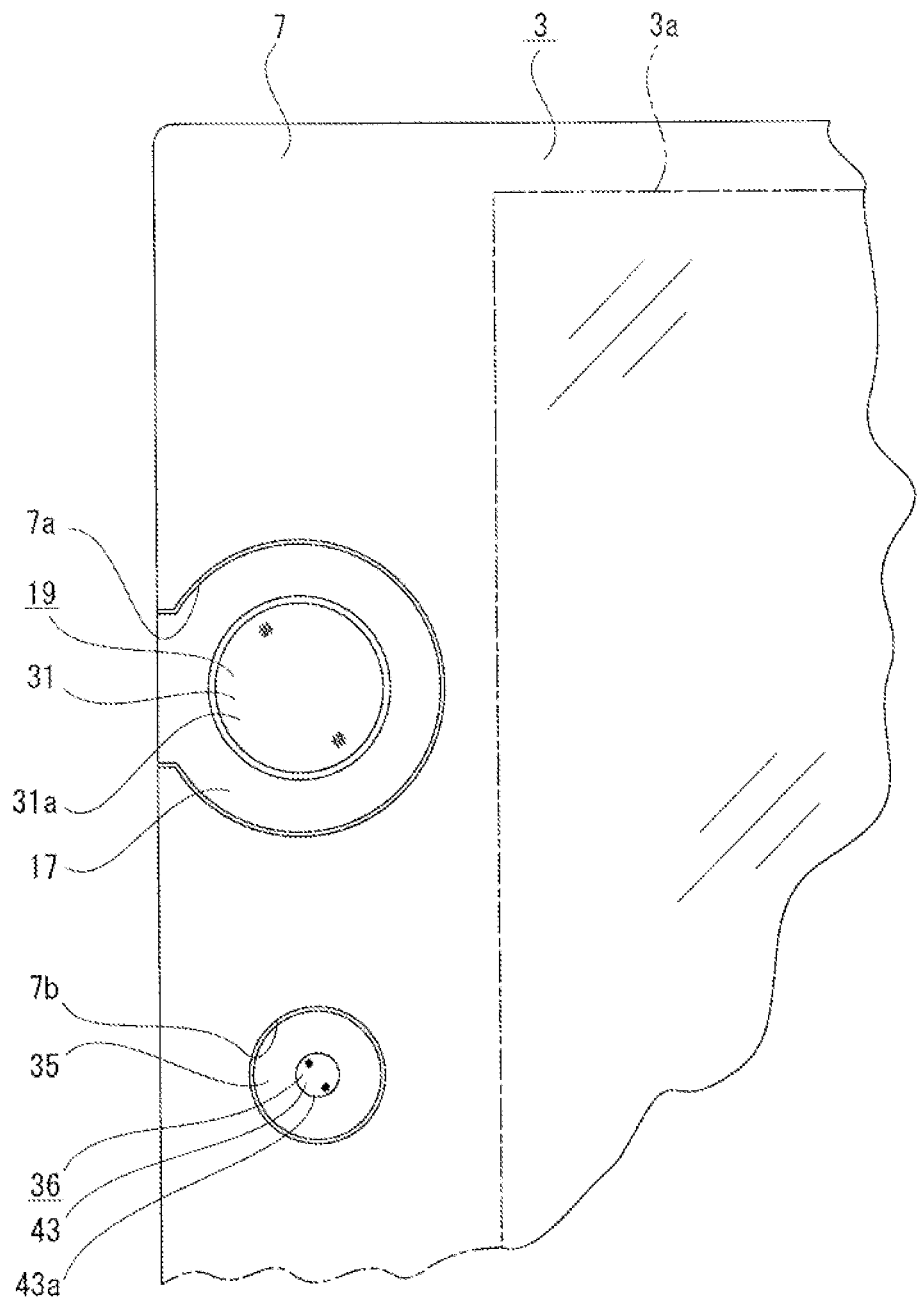

DISPLAY DEVICE

CROSS-REFERENCE TO RELATED APPLICATION

The present application is a national phase entry under 35 U.S.C. § 371 of International Application No. PCT/JP2013/084068 filed Dec. 19, 2013, published on Jul. 3, 2014 as WO 2014/103871 A1, which claims priority from Japanese Patent Application No. JP 2012-289074 filed in the Japanese Patent Office on Dec. 28, 2012.

TECHNICAL FIELD

The present technology relates to a technical field concerning a display device. Specifically, it relates to a technical field concerning a display device including a speaker unit that outputs sound and a display that outputs images, in which the speaker unit is mounted on a speaker mount section.

CITATION LIST

Patent Literature

Patent Literature 1: JP 2006-253948A

BACKGROUND ART

For a display device of a television receiver, a personal computer, or the like, there has been one that is provided with a display having a display screen on which an image is displayed; outside the display, for example, beside or below the display, a speaker unit is mounted (for example, refer to Patent Literature 1).

In the display device described in Patent Literature 1, a speaker box is mounted below the display; in the speaker box, a pair of speaker units are mounted at a horizontally spaced positions. The speaker box is formed in a laterally long shape, and its inside is formed as a space. The pair of speaker units are mounted in the inner space of the speaker box.

SUMMARY OF INVENTION

However, in the display device that includes the speaker box as described in Patent Literature 1, there is possibility that positions of the speaker units with respect to a television main body may be displaced from positions in design, because of mounting tolerance of the speaker units on the speaker box or mounting tolerance of the speaker units on the television main body.

In the meanwhile, in the above-mentioned display device including the speaker units, in order to attain improvement in sound quality of sound outputted from the speaker units, it is desirable to make a space that serves as a passage of sound outputted from a sound output section of the speaker unit be a closed space, preventing sound leakage or air leakage from other spaces.

It is therefore desirable to enhance positional accuracy of a speaker unit and to prevent sound leakage of sound outputted from the speaker unit and air leakage.

First, a display device according to an embodiment of the present technology includes: a display configured to allow an image to be displayed on a display screen; a front board mounted on a front side of the display; a mount frame that is mounted on a rear surface side of the front board and includes a speaker mount section; a speaker bracket that is mounted on the speaker mount section and includes a sound output hole; and a speaker unit that is attached to the speaker bracket and includes a sound output section. The speaker mount section is provided with an insertion hole. The front board is provided with a mount hole superposed on the insertion hole. The speaker bracket is provided with a mount protrusion that is inserted in the insertion hole and the mount hole and is positioned with respect to the mount hole. The speaker bracket is provided with an annular sealing cushion located around the sound output section.

Therefore, in the display device according to the embodiment of the present technology, the sealing cushion allows a passage of sound outputted from the sound output section to form a closed space.

Second, in the display device according to the above-described embodiment of the present technology, it is desirable that the speaker bracket be configured of a first mount member and a second mount member. The first mount member includes the mount protrusion and the sound output hole. The second mount member is attached to the first mount member from a rear surface side and includes an output hole, the output hole being superposed on the sound output hole. The sealing cushion is provided around the output hole of the second mount member, and the sealing cushion is pressed onto a rear surface of the first mount member.

The sealing cushion is provided around the output hole of the second mount member, and the sealing cushion is pressed onto the rear surface of the first mount member. Thus, a closed space is formed between the first mount member and the second mount member.

Third, in the above-described display device, it is desirable that the sealing cushion be provided around the mount protrusion of the speaker bracket, and the sealing cushion be pressed onto the speaker mount section.

The sealing cushion is provided around the mount protrusion of the speaker bracket, and the sealing cushion is pressed onto the speaker mount section. Thus, a closed space is formed between the speaker bracket and the speaker mount section.

Fourth, in the above-described display device, it is desirable that an annular blocking cushion that is pressed onto the speaker bracket be provided around the sound output section in a front surface of the speaker unit.

The annular blocking cushion that is pressed onto the speaker bracket is provided around the sound output section in the front surface of the speaker unit. Thus, a closed space is formed between the speaker unit and the speaker bracket.

Fifth, in the above-described display device, it is desirable that the second mount member be provided with a pressing cushion pressed onto the speaker mount section.

The second mount member is provided with the pressing cushion pressed onto the speaker mount section. Thus, a mounted state of the second mount member with respect to the speaker mount section becomes stable.

Sixth, in the above-described display device, it is desirable that a cover body be provided. The cover body is attached to the speaker mount section, covers the speaker bracket and the speaker unit, and retains the speaker unit from behind.

The cover body is provided that is attached to the speaker mount section, covers the speaker bracket and the speaker unit, and retains the speaker unit from behind. Thus, the speaker unit is mounted stably.

Seventh, in the above-described display device, it is desirable that a cushion member that is pressed onto the speaker mount section be provided in a periphery of the cover body.

The cushion member that is pressed onto the speaker mount section is provided in the periphery of the cover body. Thus, a closed space is formed by the cover body and the speaker mount section.

Eighth, in the above-described display device, it is desirable that a speaker control board that is configured to control the speaker unit be attached to the speaker mount section, and the speaker bracket be provided with a retaining protrusion that retains the speaker mount section.

The speaker control board configured to control the speaker unit is attached to the speaker mount section, and the speaker bracket is provided with the retaining protrusion that retains the speaker control board. Thus, displacement of the speaker control board with respect to the speaker mount section is restricted by the retaining protrusion.

Ninth, in the above-described display device, it is desirable that a speaker control board that is configured to control the speaker unit be attached to the speaker mount section. The speaker control board and the speaker unit are connected by a connection cord, and the speaker bracket is provided with a cord holder that holds the connection cord.

The speaker control board that is configured to control the speaker unit is attached to the speaker mount section. The speaker control board and the speaker unit are connected by the connection cord, and the speaker bracket is provided with the cord holder that holds the connection cord. Thus, little undesirable load from the connection cord is applied to the speaker unit.

Tenth, in the above-described display device, it is desirable that the second mount member be provided with a receiving section that is configured to restrict displacement of the first mount member in a front-rear direction with respect to the speaker mount section.

The second mount member is provided with the receiving section that is configured to restrict the displacement of the first mount member in the front rear direction with respect to the speaker mount section. Thus, unintended displacement of the first mount member is restricted by the receiving section.

The display device according to the embodiment of the present technology includes: the display configured to allow an image to be displayed on the display screen; the front board mounted on the front side of the display; the mount frame that is mounted on the rear surface side of the front board and includes the speaker mount section; the speaker bracket that is mounted on the speaker mount section and includes the sound output hole; and the speaker unit that is attached to the speaker bracket and includes the sound output section. The speaker mount section is provided with the insertion hole. The front board is provided with the mount hole superposed on the insertion hole. The speaker bracket is provided with the mount protrusion that is inserted in the insertion hole and the mount hole and is positioned with respect to the mount hole. The speaker bracket is provided with the annular sealing cushion located around the sound output section.

Accordingly, the speaker bracket to which the speaker unit is attached is positioned with respect to the front board, and the sealing cushion allows a space that serves as the passage of sound outputted from the sound output section to be a closed space. Hence, it is possible to enhance positional accuracy of the speaker unit and to prevent sound leakage of sound outputted from the speaker unit and air leakage.

In the embodiment of the technology described in claim 2, the speaker bracket is configured of the first mount member and the second mount member. The first mount member includes the mount protrusion and the sound output hole. The second mount member is attached to the first mount member from the rear surface side and includes the output hole, the output hole being superposed on the sound output hole. The sealing cushion is provided around the output hole of the second mount member, and the sealing cushion is pressed onto the rear surface of the first mount member.

Hence, it is possible to prevent sound leakage and air leakage from except the mount hole, allowing for sound output having good sound quality in the speaker unit.

In the embodiment of the technology described in claim 3, the sealing cushion is provided around the mount protrusion of the speaker bracket, and the sealing cushion is pressed onto the speaker mount section.

Hence, it is possible to prevent sound leakage and air leakage from except the mount hole, allowing for sound output having good sound quality in the speaker unit.

In the embodiment of the technology described in claim 4, the annular blocking cushion that is pressed onto the speaker bracket is provided around the sound output section in the front surface of the speaker unit.

Hence, it is possible to prevent sound leakage and air leakage from except the mount hole, allowing for sound output having good sound quality in the speaker unit.

In the embodiment of the technology described in claim 5, the second mount member is provided with the pressing cushion pressed onto the speaker mount section.

Hence, the second mount member is prevented from rattling with respect to the speaker mount section, allowing for sound output having good sound quality in the speaker unit.

In the embodiment of the technology described in claim 6, the cover body is provided that is attached to the speaker mount section, covers the speaker bracket and the speaker unit, and retains the speaker unit from behind.

Hence, a stable mounted state of the speaker unit is ensured, allowing for sound output having good sound quality in the speaker unit.

In the embodiment of the technology described in claim 7, the cushion member that is pressed onto the speaker mount section is provided in the periphery of the cover body.

Accordingly, since a closed space is formed by the cover body and the speaker mount section, leakage of sound outputted from the speaker unit is prevented, making it possible to attain enhanced sound quality.

In the embodiment of the technology described in claim 8, the speaker control board that is configured to control the speaker unit is attached to the speaker mount section. The speaker bracket is provided with the retaining protrusion that retains the speaker control board.

Accordingly, displacement of the speaker control board with respect to the speaker mount section is restricted by the retaining protrusion. Hence, it is possible to attain enhancement in workability of attachment work of the speaker control board to the speaker mount section.

In the embodiment of the technology described in claim 9, the speaker control board that is configured to control the speaker unit is attached to the speaker mount section. The speaker control board and the speaker unit are connected by the connection cord, and the speaker bracket is provided with the cord holder that holds the connection cord.

Accordingly, little undesirable load from the connection cord is applied to the speaker unit. Hence, it is possible to ensure a stable mounted state of the speaker unit.

In the embodiment of the technology described in claim 10, the second mount member is provided with the receiving section that is configured to restrict displacement of the first mount member in the front-rear direction with respect to the speaker mount section.

Accordingly, unintended displacement of the first mount member is restricted by the receiving section, allowing for sound output having good sound quality in the speaker unit.

BRIEF DESCRIPTION OF DRAWINGS

FIG. 1 illustrates, together with FIGS. 2 to 32, a display device according to an embodiment of the present technology, and is a perspective view of the display device.

FIG. 2 is a schematic exploded perspective view of the display device.

FIG. 3 is a perspective view of a mount frame.

FIG. 4 is a perspective view of a speaker mount section.

FIG. 5 is a perspective view of the speaker mount section illustrated in FIG. 4, in a state viewed in a different direction.

FIG. 6 is a cross-sectional view of the speaker mount section.

FIG. 7 is an exploded perspective view of the speaker mount section and members to be attached to the speaker mount section.

FIG. 8 is an exploded perspective view of the speaker mount section and the members to be attached to the speaker mount section illustrated in FIG. 7, in a state viewed in a different direction.

FIG. 9 is a perspective view of a first mount member.

FIG. 10 is a perspective view of the first mount member illustrated in FIG. 9, in a state viewed in a different direction.

FIG. 11 is a perspective view of a second mount member.

FIG. 12 is a perspective view of the second mount member illustrated in FIG. 11, in a state viewed in a different direction.

FIG. 13 is a perspective view of a first speaker unit.

FIG. 14 is a perspective view of the first speaker unit illustrated in FIG. 13, in a state viewed in a different direction.

FIG. 15 is a perspective view of another first speaker unit.

FIG. 16 is a perspective view of the first speaker unit illustrated in FIG. 15, in a state viewed in a different direction.

FIG. 17 is a perspective view of a second speaker bracket.

FIG. 18 is a perspective view of the second speaker bracket illustrated in FIG. 17, in a state viewed in a different direction.

FIG. 19 is a perspective view of a second speaker unit.

FIG. 20 is a perspective view of the second speaker unit illustrated in FIG. 19, in a state viewed in a different direction.

FIG. 21 is a perspective view illustrating a state in which a connection cord is held by the second speaker bracket.

FIG. 22 is a perspective view of a cover body.

FIG. 23 is a perspective view of the cover body illustrated in FIG. 22, in a state viewed in a different direction.

FIG. 24 illustrates, together with FIGS. 25 to 27, attachment procedure of each part in the first speaker structure, and is a cross-sectional view illustrating a state in which the first mount member is mounted on the speaker mount section.

FIG. 25 is a cross-sectional view illustrating a state in which the second mount member is mounted on the speaker mount section and the first mount member.

FIG. 26 is a cross-sectional view illustrating a state in which the first speaker unit is mounted on the second mount member.

FIG. 27 is a rear view illustrating a state in which each part of the first speaker structure is mounted.

FIG. 28 illustrates, together with FIGS. 29 and 30, attachment procedure of each part in the second speaker structure, and is a cross-sectional view illustrating a state in which the second speaker bracket is mounted on the speaker mount section.

FIG. 29 is a cross-sectional view illustrating a state in which the second speaker unit is mounted on the second speaker bracket.

FIG. 30 is a rear view illustrating a state in which each part of the second speaker structure is mounted.

FIG. 31 is an exploded perspective view illustrating a state before the cover body is attached to the speaker mount section.

FIG. 32 is a front view illustrating a state in which the first speaker structure and the second speaker structure are mounted.

DESCRIPTION OF EMBODIMENTS

In the following, embodiments for carrying out a display device according to an embodiment of the present technology will be described with reference to the attached drawings.

Embodiments that will be described below involve application of the display device according to the embodiment of the present technology to a television receiver that is configured to allow an image to be displayed on a display.

It is to be noted that a range of application of the present technology is not limited to a television receiver, and the present technology has a wide range of application to various display devices such as monitors used in a personal computer and so forth.

[Configuration of Display Device]

A display device (a television receiver) 1 may be formed, for example, in a laterally long, flat, and substantially rectangular shape, and may include a display (a display panel) 2, a front board 3, and a backlight unit 4 (refer to FIGS. 1 and 2). The display 2 is configured to allow an image to be displayed. The front board 3 is mounted on a front side of the display 2. The backlight unit 4 is mounted on a rear side of the display 2.

The display 2 may be formed in a shape of a plate directed in a front-rear direction. As the display 2, for example, a liquid crystal panel may be used. A region except for a periphery of a front surface of the display 2 may constitute a display screen 2e on which an image is displayed.

To a lower end of the display 2, laterally long drive boards 6, 6 may be connected via connection boards 5, 5, . . . . The connection boards 5 may have high flexibility. The drive boards 6, 6 may be located side by side horizontally.

The front board 3 may be formed in a laterally long rectangular shape and may be made of a plate-shaped material directed in the front-rear direction, for example, transparent glass. It is to be noted that the front board 3 is not limited to a transparent material as long as the front board 3 allows an image displayed on the display 2 to be visibly recognizable. Both right and left sides of the front board 3 may constitute mount surface sections 7, 7, respectively. A region surrounded by both upper and lower ends and the mount surface sections 7, 7 of the front board 3 forms an image display region 3a facing the display 2.

The mount surface section 7 may be provided with first mount holes 7a, 7a and a second mount hole 7b at vertically spaced positions.

Part of the first mount holes 7a, 7a may be communicated with a sideward space. The first mount hole 7a may be formed over the entire mount surface section 7 from a left end to a right end.

The second mount hole 7b may be located between the first mount holes 7a, 7a, and may have a smaller diameter than that of the first mount holes 7a, 7a.

A mount frame 8 may be mounted on a rear surface side of the front board 3. The mount frame 8 may include speaker mount sections 9, 9 and connection bars 10, 10 (refer to FIG. 3). The speaker mount sections 9, 9 are located at horizontally spaced positions. The connection bars 10, 10 connect the speaker mount sections 9, 9.

The speaker mount section 9 may be configured of a base surface section 11, a side surface section 12, and a holder section 13 (refer to FIGS. 4 and 5). The base surface section 11 is directed in the front-rear direction. The side surface section 12 is protruded rearward from an outer end of the base surface section 11. The holder section 13 is provided in an inner end of the base surface section 11.

On a rear surface side of the base surface section 11, protrusions 14, 14 may be provided. The protrusions 14, 14 are protruded rearward from both right and left ends of the base surface section 11.

Rear surfaces of the protrusions 14, 14 in the base surface section 11 may be formed as rear side surfaces 11a, 11a, respectively. Inner surfaces of the rear side surfaces 11a, 11a may be formed as inclined surfaces 11b, 11b that are inclined so as to be nearer to each other as they go forward. A surface between the inclined surfaces 11a, 11a may be formed as a front side surface 11c that is located forward of the rear side surfaces 11a, 11a.

The base surface section 11 may be provided with first insertion holes 9a, 9a and a second insertion hole 9b at vertically spaced positions.

The first insertion holes 9a, 9a may be formed over the entire base surface section 11 from a left end to a right end, and may have substantially same sizes as those of the first mount holes 7a, 7a of the mount surface section 7.

The second insertion hole 9b may be located between the first insertion holes 9a, 9a, and may have a smaller diameter than those of the first insertion holes 9a, 9a. The second insertion hole 9b may have a substantially same size as that of the second mount hole 7b of the mount surface section 7. The second insertion hole 9b may be located in a portion in which the front side surface 11c is formed.

Both right and left ends in an upper edge of the first insertion holes 9a, 9a in the rear surface of the base surface section 11 may be formed as respective positioning edges 11d, 11d, . . . . On a lower side of the first insertion holes 9a, 9a in the rear surface of the base surface section 11, positioning holes 11e, 11e may be formed.

A positioning recess 11f may be formed sideward of the second insertion hole 9b in the rear surface of the base surface section 11.

In both upper and lower ends of the base surface section 11, connecting protrusions 11g, 11g may be provided. The connecting protrusions 11g, 11g are protruded upward or downward.

The protrusions 14, 14 each may be provided with screw holes 14a, 14a, . . . at vertically spaced positions. The screw holes 14a, 14a, . . . are opened rearward.

The side surface section 12 may be provided with an engaging ridge 12a that is protruded inward. The engaging ridge 12a may be provided in a vertically extended state.

The holder section 13 may be formed in a concave shape opened inward.

The connection bar 10 may be extended horizontally and may be formed in a concave shape opened inward (downward or upward). The connection bars 10, 10 may be attached to the speaker mount sections 9, 9 by connecting both right and left ends to the connecting protrusions 11f, 11f of the speaker mount sections 9, 9, respectively. The mount frame 8 may be formed by attaching the connection bars 10, 10 to the speaker mount sections 9, 9.

The mount frame 8 may be mounted on a rear side of the front board 3. In a state in which the mount frame 8 is mounted on the rear side of the front board 3, the first insertion holes 9a, 9a, . . . of the mount frame 8 may be located directly behind the first mount holes 7a, 7a, . . . of the front board 3, respectively; the second insertion holes 9b, 9b of the mount frame 8 may be located directly behind the second mount holes 7b, 7b of the front board 3, respectively.

As described above, the holder sections 13, 13 of the speaker mount sections 9, 9 and the connection bars 10, 10 are formed in a concave shape opened inward. This allows a periphery of the display 2 to be inserted in these concave portions, allowing the display 2 to be held by the mount frame 8.

The backlight unit 4 may include optical sheets, a diffusion plate, a back chassis, circuit boards, or the like, and a plurality of light sources, or the like. The optical sheets, the diffusion plate, the back chassis, the circuit boards, or the like are arranged in a front-rear direction. The plurality of light sources or the like are located below. Light emitted upward from the light sources may enter the diffusion plate, may be diffused by the diffusion plate, may be controlled by the optical sheets, and may enter the display 2 as backlight. As the light sources, for example, light emitting diodes may be used.

To the speaker mount sections 9, 9, first speaker structures 15, 15, . . . and second speaker structures 16, 16 may be attached (refer to FIGS. 7 and 8).

The backlight unit 4 may be mounted so as to be opposed to the rear side of the display 2. The drive boards 6, 6 may be connected to the circuit boards of the backlight unit 4, with the connection boards 5, 5, . . . folded below the backlight unit 4.

To the speaker mount section 9, the first speaker structures 15, 15 may be attached at vertically spaced positions, and the second speaker structure 16 may be attached between the first speaker structures 15, 15. The first speaker structure 15 on an upper side may be, for example, a structure of a speaker for a passive radiator. The first speaker 15 on a lower side may be, for example, a structure of a speaker for an accelerator (full-range). The second speaker structure 16 may be, for example, a structure of a speaker for tweeter.

It is to be noted that the display device 1 may be provided with an undepicted speaker structure for woofer.

The first speaker structure 15 may be configured of a first mount member 17, a second mount member 18, and a first speaker unit 19. The first mount member 17 and the second mount member 18 may constitute a first speaker bracket 20.

The first mount member 17 may include a mount protrusion 21 and supported protrusions 22, 22, . . . (refer to FIGS. 9 and 10). The mount protrusion 21 is formed in a substantially annular shape directed substantially in the front-rear direction. The supported protrusions 22, 22, . . . are provided in a rear surface of the mount protrusion 21.

An inner hole of the mount protrusion 21 may be formed as a sound output hole 21a. The mount protrusion 21 may be provided with positioning protrusions 21b, 21b at vertically spaced positions. The positioning protrusions 21b, 21b are protruded rearward.

At least part of the supported protrusion 22 may be protruded outward beyond the mount protrusion 21.

The second mount member 18 may include a base surface section 23, retaining protrusions 24, 24, and a positioning piece 25 (refer to FIGS. 11 and 12). An outer shape of the base surface section 23 is formed in a vertically long, substantially rectangular shape. The retaining protrusions 24, 24 are protruded upward from an upper surface of the base surface section 23. The positioning piece 25 is protruded downward from a lower surface of the base surface section 23.

Four corners of the base surface section 23 may be located rearward of other portion. The four corners may be provided as fastening sections 26, 26, . . . , respectively. In the base surface section 23, a portion between the fastening sections 26, 26 arranged horizontally may be provided as a projected section 27. In the base surface section 23, a portion between the projected sections 27, 27 arranged vertically may be provided as a substantially annular pressing section 28.

In the fastening section 26, a screw insertion hole 26a may be formed. The fastening section 26 may be provided with a receiving section 26b that is protruded forward.

In the projected section 27, a portion except for both right and left portions may constitute a planar section 27a that is directed in the front-rear direction. A portion on both right and left sides of the planar section 27a may constitute inclined sections 27b, 27b. The inclined sections 27b, 27b may be inclined so as to be nearer to each other as they go forward. The planar section 27a may be provided with a positioning hole 27c. The inclined sections 27b, 27b may be provided with positioning lugs 27d, 27d.

In a front surface of the pressing section 28, a substantially annular sealing cushion 29 is provided. The sealing cushion 29 may be made of a rubber material or the like. An inner hole of the pressing section 28 may be formed as an output hole 28a.

Pressing cushions 30, 30 may be provided on a front surface on both upper and lower ends of the base surface section 22. The pressing cushions 30, 30 may be formed in a horizontally extending shape.

The sealing cushion 29 and the pressing cushions 30, 30 may be provided as, for example, part of the second mount member 18, by, for example, two-color molding.

The retaining protrusions 24, 24 may be provided at horizontally spaced positions.

The positioning piece 25 may be protruded from a center portion in a horizontal direction of the base surface section 22, and may include a positioning pin 25a that is protruded forward.

The first speaker units 19, 19 of the first speaker structure 15, 15 may be partly different in shape for a passive radiator (refer to FIGS. 13 and 14) and for an accelerator (refer to FIGS. 15 and 16); otherwise, their basic configurations may be substantially same. The first speaker unit 19 may be configured of a main body 31, four attached pieces 32, 32, . . . , and positioning pieces 33, 33. The four attached pieces 32, 32, . . . are protruded radially from the main body 31. The positioning pieces 33, 33 may be protruded upward and downward from the main body 31, respectively.

In a front surface of the main body 31, an annular blocking cushion 34 may be provided. The blocking cushion 34 may be made of a rubber material or the like. In the main body 31, a portion inside the blocking cushion 34 may constitute a sound output section 31a.

At a tip of the attached piece 32, an insertion hole 32a may be formed.

In the positioning piece 33, a positioning hole 33a may be formed.

The second speaker structure 16 may be configured of a second speaker bracket 35 and a second speaker unit 36 (refer to FIGS. 7 and 8).

The second speaker bracket 35 may include a base surface section 37 and a mount protrusion 38 (refer to FIGS. 17 and 18). The base surface section 37 is formed in a vertically long, substantially rectangular shape. The mount protrusion 38 is protruded forward from a center portion of the base surface section 37.

The base surface section 37 may include a planar section 39, inclined sections 40, 40, and fastening sections 41, 41. The planar section 39 is directed in the front-rear direction. The inclined sections 40, 40 are formed continuously with both right and left sides of the planar section 39. The fastening sections 41, 41 are formed continuously with outer sides in a horizontal direction of the inclined sections 40, 40.

In a rear surface of the planar section 39, attachment bosses 39a, 39a having screwing holes may be provided at vertically spaced positions. In the rear surface of the planar section 39, positioning axes 39b, 39b may be provided on right and left sides of the attachment boss 39a. The positioning axes 39b, 39b are protruded rearward. In the rear surface of the planar section 39, cord holders 39c, 39c, . . . may be provided on an opposite side of the attachment boss 39a with the positioning axes 39b, 39b interposed therebetween. The cord holders 39c, 39c, . . . are protruded rearward.

In both upper and lower ends of the fastening section 41, respective screw insertion holes 41a, 41a may be formed. In one of the fastening sections 41, a screwing hole 41b may be formed in a center portion in the vertical direction. One of the fastening sections 41 may be provided with a positioning protrusion 41c that is protruded forward.

The positioning protrusion 38 may be protruded forward from the planar section 39, and may be formed in an annular shape. An inner hole of the positioning protrusion 38 may be formed as a sound output hole 38a.

In the second speaker bracket 35, an annular sealing cushion 42 may be provided on a front surface of the base surface section 37. The sealing cushion 42 may be made of a rubber material or the like. The sealing cushion 42 may be located around the positioning protrusion 38. The sealing cushion 42 may be provided by two-color molding, similarly to the sealing cushion 29.

The second speaker unit 36 may be configured of a main body 43 and attached pieces 44, 44 (refer to FIGS. 19 and 20). The attached pieces 44, 44 are protruded upward and downward from the main body 43, respectively.

In a front surface of the main body 43, an annular blocking cushion 45 may be provided. The blocking cushion 45 may be made of a rubber material or the like. In the main body 43, a portion inside the blocking cushion 45 may constitute a sound output section 43a.

The attached piece 44 may be provided with an insertion hole 44a.

Speaker control boards 46, 46 may be attached to upper ends of the speaker mount sections 9, 9 by screwing or the like (refer to FIGS. 7 and 8). The speaker control board 46 may be connected to the first speaker units 19, 19, the second speaker unit 36, and a woofer speaker unit via connection cords 47, 47, . . . .

The connection cords 47, 47 may be arranged and held between the cord holders 39*c*, 39*c*, . . . in the second speaker structure 16 (refer to FIG. 21).

As described above, the connection cords 47, 47 are arranged and held between the cord holders 39*c*, 39*c*, . . . in the second speaker structure 16. Thus, little undesirable load from the connection cords 47, 47 is applied to the second speaker unit 36, making it possible to ensure a stable mounted state of the second speaker unit 36.

Moreover, the cord holders 39*c*, 39*c*, . . . are provided in the second speaker bracket 35. Thus, a dedicated member for providing a holder to hold the connection cord 47 is unnecessary. This makes it possible to attain reduction in the number of components and reduction in manufacturing cost.

Cover bodies 48, 48 may be attached to the respective speaker mount sections 9, 9 from a rear surface side (refer to FIGS. 7 and 8). The cover body 48 may be formed in a vertically long, box-like shape opened forward. In a periphery of the cover body 48, retaining protrusions 49, 49, . . . may be provided at circumferentially spaced positions (refer to FIGS. 22 and 23). The retaining protrusions 49, 49, . . . are protruded forward.

In a front end of the retaining protrusion 49, a screw hole 49*a* may be formed. The screw hole 49*a* penetrates the front end of the retaining protrusion 49 in the front-rear direction. In an upper end of the cover body 48, engaging pieces 48*a*, 48*a* may be provided at horizontally spaced positions (refer to FIGS. 22 and 23). The engaging pieces 48, 48 are protruded upward.

A cushion member 50 may be bonded to a front surface in the periphery of the cover body 48. The cushion member 50 may be made of a rubber material or the like.

In a state in which the backlight unit 4 is mounted on the rear side of the display 2 and the cover bodies 48, 48 are mounted on the speaker mount sections 9, 9, an undepicted back cover may be attached from behind by screwing or the like. Both right and left ends of the back cover may be engaged with the respective engaging ridges 12*a*, 12*a* that are provided in the side surface section 12 of the mount frame 8. Moreover, a stand 51 may be attached to a lower end of the backlight unit 4 (refer to FIG. 1). The stand 51 may ensure a stable installation state of the display device 1 on a desk or the like.

[Attachment of Speaker Structure]

In the following, attachment procedure of the first speaker structure 15 and the second speaker structure 16 to the speaker mount section 9 will be described (refer to FIGS. 24 to 31).

First, description will be given on attachment procedure of the first speaker structure 15 to the speaker mount section 9 (refer to FIGS. 24 to 27).

In a state in which the mount frame 8 is attached in contact with the rear surface of the front board 3, first, the first mount member 17 is mounted from behind on the speaker mount section 9 of the mount frame 8 (refer to FIG. 24). In the first mount member 17, the mount protrusion 21 is inserted in the first mount hole 7*a* through the first insertion hole 9*a*. Thus, the first mount member 17 is positioned with respect to the first insertion hole 7*a*. At this occasion, the supported protrusions 22, 22, . . . of the first mount member 17 are engaged with the rear surface of the base surface section 11. Thus, the first mount member 17 is positioned in the front-rear direction with respect to the speaker mount section 9.

Next, the second mount member 18 is mounted on the speaker mount section 9 and the first mount member 17 (refer to FIG. 25). In the second mount member 18, the positioning lugs 27*d*, 27*d* and the positioning pin 25*a* are engaged with the positioning edges 11*d*, 11*d* and the positioning hole 11*e*, respectively. Thus, the second mount member 18 is positioned with respect to the speaker mount section 9. Simultaneously, the positioning protrusions 21*b*, 21*b* are inserted in the respective positioning holes 27*c*, 27*c*. Thus, the second mount member 18 is positioned with respect to the first mount member 17.

In the second mount member 18, the sealing cushion 29 is pressed onto and adheres to a rear surface in the mount protrusion 21 of the first mount member 17, while the pressing cushions 30, 30 are pressed onto and adheres to the rear surface of the base surface section 11.

Next, the first speaker unit 19 is mounted from behind on the second mount member 18 (refer to FIGS. 26 and 27). The positioning pins 25*a*, 25*a* are inserted in the respective positioning holes 33*a*, 33*a* formed in the positioning pieces 33, 33. Thus, the first speaker unit 19 is positioned with respect to the second mount member 18. In the first speaker unit 19, the attached pieces 32, 32, . . . are in contact with rear surfaces of the respective fastening sections 26, 26, . . . of the second mount member 18, and the insertion holes 32*a*, 32*a*, . . . are superposed on the respective screw insertion holes 26*a*, 26*a*, . . . .

At this occasion, in the first speaker unit 19, the sealing cushion 34 is pressed onto and adheres to a rear surface in the pressing section 28 of the second mount member 18.

Next, description will be made on attachment procedure of the second speaker structure 16 to the speaker mount section 9 (refer to FIGS. 28 to 30).

In a state in which the mount frame 8 is attached in contact with the rear surface of the front board 3, first, the second speaker bracket 35 is mounted from behind on the speaker mount section 9 of the mount frame 8 (refer to FIG. 28). In the second speaker bracket 35, the mount protrusion 38 is inserted in the second mount hole 7*b* through the second insertion hole 9*b*. Thus, the second speaker bracket 35 is positioned with respect to the second insertion hole 7*b*.

At this occasion, the sealing cushion 42 of the second speaker bracket 35 is pressed onto and adheres to the rear surface of the base surface section 11. Thus, the second speaker bracket 35 is positioned in the front-rear direction with respect to the speaker mount section 9.

Next, the second speaker unit 36 is mounted from behind on the second speaker bracket 35 (refer to FIGS. 29 and 30). In the second speaker unit 36, the attached pieces 44, 44 are in contact with the respective attachment bosses 39*a*, 39*a*. Attachment screws 100, 100 are inserted in the respective insertion holes 44*a*, 44*a* and screwed with the attachment bosses 39*a*, 39*a*. Thus, the second speaker unit 36 is attached to the second speaker unit 36.

At this occasion, in the second speaker unit 36, the sealing cushion 45 is pressed onto and adheres to a rear surface in the mount protrusion 38 of the second speaker bracket 35.

As described above, the first mount member 17, the second mount member 18, and the first speaker unit 19 are mounted to constitute the first speaker structure 15, while the first speaker bracket 35 and the second speaker bracket 36 are mounted to constitute the second speaker structure 16. In this state, the cover body 48 is mounted from behind on the speaker mount section 9 (refer to FIG. 31).

It is to be noted that the speaker control board 46 is mounted on the speaker mount section 9 before the first speaker structure 15 on the upper side is mounted on the speaker mount section 9. The speaker control board 46 is retained by the retaining protrusions 24, 24 of the second mount member 18 in a state in which the second mount member 18 in the first speaker structure 15 on the upper side is mounted on the speaker mount section 9.

Accordingly, displacement of the speaker control board 46 with respect to the speaker mount section 9 is restricted by the retaining protrusions 24, 24. This makes it possible to attain enhancement in workability of attachment work of the speaker control board 46 to the speaker mount section 9.

In a state in which the cover body 48 is mounted on the speaker mount section 9, the cushion member 50 is pressed onto and adheres to the rear surface of the speaker mount section 9. Accordingly, a closed space is formed inside by the cover body 48 and the speaker mount section 9.

As described above, the cushion member 50 that is pressed onto the speaker mount section 9 is provided in the periphery of the cover body 48. A closed space is formed by the cover body 48 and the speaker mount section 9. Accordingly, leakage of sound outputted from the first speaker units 19, 19, . . . and the second speaker units 36, 36 is prevented, making it possible to attain enhanced sound quality.

The cover body 48 is mounted on the speaker mount section 9, with the engaging pieces 48a, 48a engaged with part of the speaker mount section 9. In a state in which the cover body 48 is mounted on the speaker mount section 9, the fastening sections 26, 26, . . . of the second mount member 18, 18, the attached pieces 44, 44, . . . of the second speaker unit 36, and the speaker control board 46 are retained by the retaining protrusions 49, 49, . . . .

In the screw holes 49a, 49a, . . . of the cover body 48, respective second attachment screws 200, 200, . . . are inserted. At this occasion, the second attachment screws 200, 200, . . . are inserted through the screw insertion holes 26a, 26a, . . . formed in the fastening sections 26, 26, . . . of the second mount member 18, and are screwed with the screw holes 14a, 14a, . . . of the speaker mount section 9. Thus, the first speaker structure 15 is attached to the speaker mount section 9. Moreover, other second attachment screws 200, 200, . . . are inserted through the insertion holes 44a, 44a, . . . formed in the attached pieces 44, 44, . . . of the second speaker unit 36 and the screw insertion holes 41a, 41a, . . . formed in the fastening sections 41, 41, . . . of the second speaker bracket 35, and are screwed with the screw holes 14a, 14a, . . . of the speaker mount section 9. Thus, the second speaker structure 16 is attached to the speaker mount section 9. Furthermore, still other second attachment screws 200, 200, . . . are inserted through the speaker control board 46, and are screwed with the screw holes 14a, 14a, . . . of the speaker mount section 9. Thus, the speaker control board 46 is attached to the speaker mount section 9.

As described above, the cover body 48 is attached to the speaker mount section 9, and the first speaker structures 15, 15 and the second speaker structure 16 are attached to the speaker mount section 9. In this state, as illustrated in FIG. 32, the mount protrusions 21, 21 of the first mount members 17, 17 and the sound output section 31a of the first speaker unit 19 are mounted in the respective first mount holes 7a, 7a of the front board 3, while the mount protrusion 38 of the second speaker bracket 35 and the sound output section 43a of the second speaker unit 36 are mounted in the second mount hole 7b of the front board 3.

It is to be noted that, at the time of sound output from the first speaker unit 19, vibration due to sound pressure may be generated, and the vibration thus generated may be transmitted to the first mount member 17. Here, behind the supported protrusions 22, 22, . . . of the first mount member 17, the receiving sections 26b, 26b, . . . of the second mount member 18 are located in proximity thereto.

Accordingly, unintended displacement of the first mount member 17 is restricted by the receiving sections 26b, 26b, . . . . This allows for sound output having good sound quality in the first speaker unit 19.

SUMMARY

As described above, in the display device 1, the first speaker bracket 20 is provided with the mount protrusion 21 that is positioned with respect to the first mount hole 7a of the front board 3, and the annular sealing cushion 29 is provided around the mount protrusion 21.

Moreover, the second speaker bracket 35 is provided with the mount protrusion 38 that is positioned with respect to the second mount hole 7b of the front board 3, and the annular sealing cushion 42 is provided around the mount protrusion 38.

Accordingly, the first speaker bracket 20 or the second speaker bracket 35 to which the first speaker unit 19 or the second speaker unit 36 is attached is positioned with respect to the front board 3. Moreover, the sealing cushions 29, 42 allow the space that serves as the passage of sound outputted from the sound output sections 31a, 43a to be a closed space. This makes it possible to enhance positional accuracy of the first speaker unit 19 and the second speaker unit 36, and to prevent sound leakage of sound outputted from the first speaker unit 19 and the second speaker unit 36 and air leakage.

In addition, in the first speaker structure 15, the first speaker bracket 20 is configured of the first mount member 17 and the second mount member 18. The sealing cushion 29 is provided around the output hole 28a of the second mount member 18. The sealing cushion 29 is pressed onto the rear surface of the first mount member 17.

Accordingly, it is possible to prevent sound leakage and air leakage from except the second mount hole 7b, allowing for sound output having good sound quality in the first speaker unit 19.

Furthermore, in the second speaker structure 16, the sealing cushion 42 is provided around the mount protrusion 38 of the second speaker bracket 35. The sealing cushion 42 is pressed onto the speaker mount section 9.

Accordingly, it is possible to prevent sound leakage and air leakage from except the second mount hole 7b, allowing for sound output having good sound quality in the second speaker unit 36.

Furthermore, in addition, the annular blocking cushions 34, 45 are provided around the sound output sections 31a, 43a in the front surfaces of the first speaker unit 19 and the second speaker unit 36. The annular blocking cushions 34, 45 are pressed onto the first speaker bracket 20 or the second speaker bracket 35.

Accordingly, it is possible to prevent sound leakage and air leakage from except the second mount hole 7b, allowing for sound output having good sound quality in the first speaker unit 19 and the second speaker unit 36.

Moreover, the annular sealing cushion 29 is provided around the mount protrusion 21 of the second mount member 18 in the first speaker bracket 20. The annular sealing cushion 29 is pressed onto the rear surface of the speaker mount section 9. It is therefore possible to prevent sound leakage and air leakage from except the first mount hole 7a, allowing for sound output having good sound quality in the first speaker unit 19.

Furthermore, the pressing cushions 30, 30 are provided in the second mount member 18. The pressing cushions 30, 30 are pressed onto the rear surface of the speaker mount section 9. Accordingly, the second mount member 18 is prevented from rattling with respect to the speaker mount section 9, allowing for sound output having good sound quality in the first speaker unit 19.

In addition, the cover body 48 is provided that is attached to the speaker mount section 9, covers the first speaker structure 15, 15, and retains the first speaker unit 19 from behind. Accordingly, a stable mounted state of the first speaker unit 19 is ensured, allowing for sound output having good sound quality in the first speaker unit 19.

[Present Technology]

The present technology may have the following configurations.

(1)

A display device, including:

a display configured to allow an image to be displayed on a display screen;

a front board mounted on a front side of the display;

a mount frame that is mounted on a rear surface side of the front board and includes a speaker mount section;

a speaker bracket that is mounted on the speaker mount section and includes a sound output hole; and a speaker unit that is attached to the speaker bracket and includes a sound output section, wherein the speaker mount section is provided with an insertion hole, the front board is provided with a mount hole superposed on the insertion hole, the speaker bracket is provided with a mount protrusion that is inserted in the insertion hole and the mount hole and is positioned with respect to the mount hole, and the speaker bracket is provided with a sealing cushion located around the sound output section.

(2)

The display device according to (1), wherein the speaker bracket is configured of a first mount member and a second mount member, the first mount member including the mount protrusion and the sound output hole, and the second mount member being attached to the first mount member from a rear surface side and including an output hole, the output hole being superposed on the sound output hole, the sealing cushion is provided around the output hole of the second mount member, and the sealing cushion is pressed onto a rear surface of the first mount member.

(3)

The display device according to (1), wherein the sealing cushion is provided around the mount protrusion of the speaker bracket, and the sealing cushion is pressed onto the speaker mount section.

(4)

The display device according to any one of (1) to (3), including an annular blocking cushion that is provided around the sound output section in a front surface of the speaker unit and is pressed onto the speaker bracket.

(5)

The display device according to (2) or (4), wherein the second mount member is provided with a pressing cushion pressed onto the speaker mount section.

(6)

The display device according to any one of (1) to (5), including a cover body that is attached to the speaker mount section, covers the speaker bracket and the speaker unit, and retains the speaker unit from behind.

(7)

The display device according to (6), including a cushion member that is provided in a periphery of the cover body and is pressed onto the speaker mount section.

(8)

The display device according to any one of (1) to (7), including a speaker control board that is configured to control the speaker unit and is attached to the speaker mount section, wherein the speaker bracket is provided with a retaining protrusion that retains the speaker mount section.

(9)

The display device according to any one of (1) to (7), including a speaker control board that is configured to control the speaker unit and is attached to the speaker mount section, wherein the speaker control board and the speaker unit are connected by a connection cord, and the speaker bracket is provided with a cord holder that holds the connection cord.

(10)

The display device according to any one of (2) or (4) to (9), wherein the second mount member is provided with a receiving section that is configured to restrict displacement of the first mount member in a front-rear direction with respect to the speaker mount section.

Specific shape and structure of each section that have been exemplified in the example embodiment to carry out the above-described technology are merely an example in carrying out the present technology, and the technical range of the present technology should not be interpreted in a limited manner by these.

This application claims the benefit of Japanese Priority Patent Application JP 2012-289074 filed on Dec. 28, 2012, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display device, comprising:
a display configured to allow an image to be displayed on a display screen;
a front board mounted on a front side of the display;
a mount frame that is mounted on a rear surface side of the front board and includes a speaker mount section;
a speaker bracket that is mounted on the speaker mount section and includes a sound output hole; and
a speaker unit that is attached to the speaker bracket and includes a sound output section,
wherein the speaker mount section is provided with an insertion hole,
the front board is provided with a mount hole superposed on the insertion hole,
the speaker bracket is provided with a mount protrusion that is inserted in the insertion hole and the mount hole and is positioned with respect to the mount hole,
the speaker bracket is provided with a sealing cushion located around the sound output section, and
the speaker bracket is configured of a first mount member and a second mount member, the sealing cushion and a pressing cushion are provided on a front side of the second mount member such that (i) the sealing cushion is arranged between the front side of the second mount member and a rear side of the first mount member and (ii) the pressing cushion is arranged between the front side of the second mount member and a rear side of the speaker mount section.

2. The display device according to claim 1,
wherein the first mount member includes the mount protrusion and the sound output hole, and the second mount member being attached to the first mount member from the rear side and including an output hole, the output hole being superposed on the sound output hole, the sealing cushion is provided around the output hole of the second mount member, and the sealing cushion is pressed onto a rear surface of the rear side of the first mount member.

3. The display device according to claim 1, further comprising a cover body that is attached to the speaker mount section, covers the speaker bracket and the speaker unit, and retains the speaker unit from behind.

4. The display device according to claim 3, further comprising a cushion member that is provided in a periphery of the cover body and is pressed onto the speaker mount section.

5. The display device according to claim 1, further comprising a speaker control board that is configured to control the speaker unit and is attached to the speaker mount section,
wherein the speaker bracket is provided with a retaining protrusion that retains the speaker mount section.

6. The display device according to claim 1, further comprising a speaker control board that is configured to control the speaker unit and is attached to the speaker mount section,
wherein the speaker control board and the speaker unit are connected by a connection cord, and the speaker bracket is provided with a cord holder that holds the connection cord.

7. The display device according to claim 2,
wherein the second mount member is provided with a receiving section that is configured to restrict displacement of the first mount member in a front-rear direction with respect to the speaker mount section.

\* \* \* \* \*